United States Patent
Stark et al.

(10) Patent No.: US 8,182,573 B2
(45) Date of Patent: May 22, 2012

(54) METHODS AND DEVICES FOR FLAME SPRAY PYROLYSIS

(75) Inventors: Wendelin Stark, Zürich (CH); Robert N. Grass, Zürich (CH); Evagelos-Kimon Athanassiou, Zürich (CH)

(73) Assignee: ETH Zürich, Zürich (CH)

( * ) Notice: Subject to any disclaimer, the term of this patent is extended or adjusted under 35 U.S.C. 154(b) by 688 days.

(21) Appl. No.: 12/065,882

(22) PCT Filed: Sep. 4, 2006

(86) PCT No.: PCT/CH2006/000477
§ 371 (c)(1),
(2), (4) Date: Jun. 10, 2008

(87) PCT Pub. No.: WO2007/028267
PCT Pub. Date: Mar. 15, 2007

(65) Prior Publication Data
US 2008/0268246 A1 Oct. 30, 2008

(30) Foreign Application Priority Data
Sep. 6, 2005 (EP) .................................. 05019287

(51) Int. Cl.
B22F 9/30 (2006.01)
B22F 9/24 (2006.01)
C22C 1/05 (2006.01)
(52) U.S. Cl. ........................................... 75/362; 75/363
(58) Field of Classification Search .......... 428/402–403, 428/546, 570; 75/362–363
See application file for complete search history.

(56) References Cited

U.S. PATENT DOCUMENTS

| 4,042,334 | A | * | 8/1977 | Matovich | 422/186 |
| 5,728,195 | A | * | 3/1998 | Eastman et al. | 75/351 |
| 6,254,940 | B1 | | 7/2001 | Pratsinis et al. | |
| 6,277,774 | B1 | * | 8/2001 | Xiao et al. | 501/12 |
| 6,679,937 | B1 | * | 1/2004 | Kodas et al. | 75/365 |
| 2004/0050207 | A1 | * | 3/2004 | Wooldridge et al. | 75/362 |
| 2004/0126298 | A1 | * | 7/2004 | Stark et al. | 423/263 |
| 2004/0231464 | A1 | | 11/2004 | Kurihara et al. | |
| 2005/0176990 | A1 | * | 8/2005 | Coleman et al. | 562/11 |
| 2005/0186104 | A1 | * | 8/2005 | Kear et al. | 419/11 |
| 2005/0227864 | A1 | * | 10/2005 | Sutorik et al. | 502/304 |
| 2006/0150677 | A1 | * | 7/2006 | Kobayashi | 65/27 |

FOREIGN PATENT DOCUMENTS

DE  101 31 173 A1  1/2003

OTHER PUBLICATIONS

Madler et al., Simultaneous deposition of Au Nanoparticles during flame synthesis of TiO2 and SiO2. J. Mater. Res. vol. 18, No. 1, pp. 115-120 (Jan. 2003).*

(Continued)

*Primary Examiner* — Alicia Chevalier
*Assistant Examiner* — Alexandre Ferre
(74) *Attorney, Agent, or Firm* — Marshall, Gerstein & Borun LLP

(57) ABSTRACT

The present invention relates the manufacture of metal powders, non-oxidic ceramic powders and reduced metal oxide powders using an improved flame spray pyrolysis ("FSP") process. The invention further relates to an apparatus specifically adapted to said process, to powders/naoncomposites obtained by said process and to the use of said powders/nanocompsites.

20 Claims, 12 Drawing Sheets

OTHER PUBLICATIONS

Majumdar et al., Copper (I) oxide powder generation by spray pyrolysis, J. Mater. Res. vol. 11, No. 11, pp. 2861-2868 (Nov. 1996).*
Pratsinis, "Flame Aerosol Synthesis of Ceramic Powders," *Prog. Energy Combust. Sci*, 24, 197-219 (1998).
Mädler et al., "Simultaneous deposition of Au nanoparticles during flame synthesis of TiO$_2$ and SiO$_2$," *J. Mater. Res*. vol. 18, No. 1, Jan. 2003, pp. 115-120.

Grass et al., "Gas phase synthesis of fcc-cobalt nanoparticles," *J. Mater. Chem*, vol. 16, Mar. 2006, pp. 1825-1830.
Grass et al., "Flame spray synthesis under a non-oxidizing atmosphere: Preparation of metallic bismuth nanoparticles and nanocrystalline bulk bismuth metal," *Journal of Nanoparticle Research*, Mar. 2006.

* cited by examiner

METHODS AND DEVICES FOR FLAME SPRAY PYROLYSIS

This Application is the U.S. national phase of International Application No. PCT/CH2006/000477, filed Sep. 4, 2006, which designated the U.S. and claims priority to European Patent Application No. 05019287.1, filed Sep. 6, 2005, the entire contents of each of which are hereby incorporated by reference.

FIELD OF THE INVENTION

The present invention relates the manufacture of metal powders, non-oxidic ceramic powders and reduced metal oxide powders using an improved flame spray pyrolysis ("FSP") process. The invention further relates to an apparatus specifically adapted to said process, to powders/naoncomposites obtained by said process and to the use of said powders/nanocompsites.

BACKGROUND ART

Flame spray pyrolysis (WO2005/103900, EP1378489) represents a cost efficient process for the manufacturing of high quality metal oxide nano-powders. The resulting powders show a very high surface area together with high material purity. The process further gives the possibility of producing mixed metal oxides with a high homogeneity both in chemical composition and powder particle size. The powders are mostly un-agglomerated and of very narrow size distribution. It was recently shown (Loher et al. 2005, Huber et al. 2005, Grass and Stark 2005) that the process is also capable of producing salts such as calcium-phosphates and fluorides.

Metal, non-oxidic ceramic and reduced metal oxide nano-powders which are currently not available from flame spray pyrolysis are of large industrial interest: Besides giving very colourful materials for use in pigments (Bahador 1995), reduced metal oxides exhibit semi-conducting properties (Lou et al. 2005) and a high ion conductivity of interest for electronic applications and solid state fuel cells. Non-oxidic ceramics such as tungsten-carbide, cobalt-nitride and many others display excellent mechanical properties (GB696589) such as very high hardness and temperature resistance making them of interest for high duty applications such as cutting tools and protective coatings. Nano-sized metal powders such as iron, steel, copper, cobalt and others are of interest for powder metallurgy. Further, these materials exhibit size dependent characteristics (Modrow et al. 2005) such as enhanced electronic, magnetic (Kodama 1999) or mechanical properties giving them manifold applications in the electronic and machining industry. All three groups of materials have applications as reactive surfaces, as ceramics, building materials and in heterogeneous catalysis, especially when the particles are of small size exhibiting large surface areas. Two selected examples of catalysts of interest are tungsten-carbide for platinum-like catalysis such as hydrogenation (Levy and Boudart 1973) and metal nitrides as well as alloys of metal nitrides for hydrodenitrogenation (Milad et al. 1998; Wang et al. 2005). Further applications include low melting alloys for interconnects in electronics (Li et al. 2005).

Currently metal powders and alloys are produced by a series of different processes depending on the necessary product size and purity. For large metal particles (above 1 micrometer) atomization of liquid metal using a nozzle, disk or cup (see e.g. US 2005/009789 and references therein) is used as an efficient low cost method. Particle size is strongly limited by the smallest liquid droplet which can be formed. Smaller particles can be formed by alloy leaching (see e.g. WO 2004/000491). This process is limited to only a few metals and their alloys, results in large amounts of liquid waste and leads to strongly agglomerated particles which have to be de-agglomerated (e.g. by milling). Spherical, un-agglomerated and monodisperse metal nano-particles can also be obtained by wet-phase chemistry (such as Nicolais 2005). Besides the large liquid waste produced by these processes, the application of the produced particles is limited to the liquid phase as it is difficult to dry the powders completely without leaving surfactants and solvents contaminating the residual product. High temperature electronic processes, such as lasers (Dez et al. 2002) and plasma reactors (e.g. U.S. Pat. No. 5,486,675, GB 2 365 876, DE 39 37 740) are used for the fabrication of nanosized metal powders. Due to the high necessary temperatures (several 1000 K), the high cost of electrical energy and low efficiency, these processes remain relatively expensive and complex. A further method for the synthesis for metal nano particles is vapor flow condensation (see Wegner et al. 2002 and references therein). This process however is limited to metals with low vaporisation temperature. Several pyrolysis processes in hot tubes have been reported in the academic literature (Eroglu et al. 1996, Knipping et al. 2004) but all are limited to low production rates. The major disadvantage of these processes is the diffusion and thermophoresis of particles to the tube wall and therefore lowering the process yield making up-scaling difficult. All state of the art processes give particles with a broad size distribution that is undesirable in most applications.

It is therefore of great industrial interest to have a production method which best combines cost efficiency and versatility.

BRIEF DESCRIPTION OF THE DRAWINGS

The invention will be better understood and objects other than those set forth above will become apparent when consideration is given to the following detailed description thereof. Such description makes reference to the annexed drawings, wherein:

FIG. 3a shows a porous tube used in example 2, 4, 6, 10, 11, 12, 14 and 15.

FIG. 3b is a cross-section through the tube of FIG. 3a.

DISCLOSURE OF THE INVENTION

Figure 1:
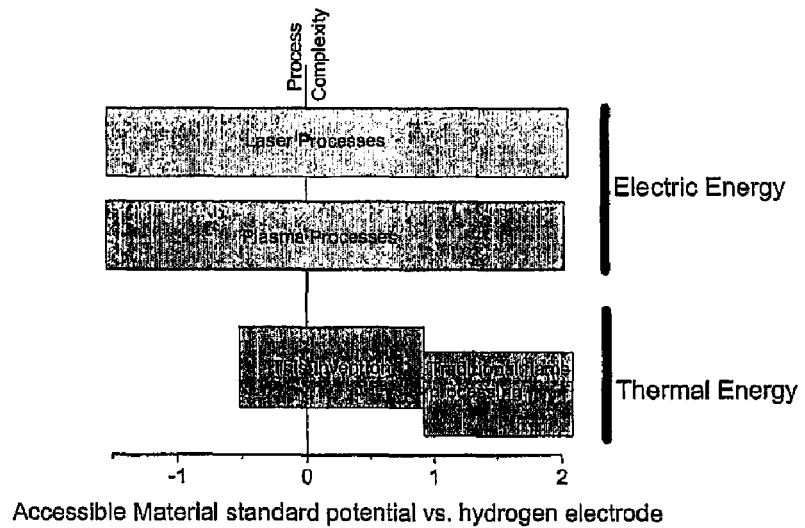
FIG. 1 shows the accessible materials of this invention in comparison to state of the art materials in terms of process complexity and standard formation potential as defined in Riedel (1999).

Hence, it is a first object of the invention to provide an improved method for the production of powders different from metal oxides, in particular nano particles of metals, of non-oxidic ceramics, of reduced metal-oxides and of its mixtures/alloys.

A second object of the present invention is to provide an improved device/apparatus for the manufacture of said powders.

Another object of the present invention are powders obtainable by a method of the present invention.

Yet another object of the present invention is the use of such powders.

These objectives are achieved by a method as defined in claim 1 and an apparatus as defined in claim 19. Further aspects of the invention are disclosed in the specification and independent claims, preferred embodiments are disclosed in the specification and the dependent claims.

Unless otherwise specified, the following definitions shall apply in this specification.

The term "reduced metal oxides" refers to metal oxides wherein the metal is in a lower oxidation state than the thermodynamic most stable oxidation state at room temperature.

The "protecting gas" is known in the field and refers to inert gases such as nitrogen, argon or helium and mixtures thereof.

The "Reducing gases" are known in the field and include hydrogen and methane and CO. Preferably, such reducing gases are directly applied to the flame.

The "fuel-oxygen equivalence ratio" is defined as the ratio of the actual fuel/air ratio to the stoichiometric fuel/air ratio, calculated from the gases leaving the flame nozzle, neglecting the gases present in the atmosphere surrounding the flame and the gases fed towards the flame and off gas after ignition e.g. through the sinter metal tube. The stoichiometric fuel/air ratio concerns the full combustion of the fuel to $CO_2$ and $H_2O$.

The "standard potential" is the potential measured electrochemically against a standard hydrogen electrode at a concentration of 1 Molar for all dissolved components, a pressure of 1 atmosphere and a temperature of 25° C. (c.f. Riedel 1999)

The term "powders" as used in this specification refers to finely divided granular material, e.g. obtained from an FSP process. Typically, the individual granules of a powder have similar properties.

The present invention will be described in more detail below. It is understood that the various aspects, embodiments, preferences and ranges as provided/disclosed in this specification may be combined at will. Further, depending of the specific embodiment, selected definitions, embodiments or ranges may not apply.

In a first aspect, the invention relates to a method for the production of powders selected from the group consisting of metal powders, non-oxidic ceramic powders and reduced metal oxide powders as well as mixtures and alloys thereof, wherein said method comprises flame spray pyrolysis (FSP) of a combustible precursor solution, and wherein said method being performed in an atmosphere with an $O_2$ concentration below 1000 ppm (volume/volume) measured in the off-gas and wherein said method being performed using an oxygen-containing gas as oxidizing agent.

To better localize the present invention with regard to known methods accounting for process complexity and producible metal of given standard potential, an illustration is given in FIG. 1. In general, it is sufficient to shield the flame and preferably also the production path up to the particle collection from ambient air to achieve the desired $O_2$ concentration. In a preferred embodiment, however, the flame and the production path are incorporated into a porous tube, e.g. a sintered tube that preferably is incorporated in a larger tight tube. In the case of two tubes, an additional shield may be employed. This configuration allows forming a gas film on the tube surface thereby stabilizing the porous tube and also cooling the flame such enabling to control the flame temperature. In order to control particle deposition, the tube may be cooled in the proximity of the collector.

The method of the present invention makes to some extent use of flame spray pyrolysis (FSP) methods previously developed for oxides. Due to amendments (as described herein) relating to the apparatus and to the process, new materials are obtainable.

In one embodiment, inert gases such as $N_2$, $CO_2$ or noble gases are used as gas shield and applied to reduce the oxygen content in the flame and adjacent to the flame. Optionally, the inert gases are recycled after $H_2O$ and $CO_2$ removal (by e.g. zeolites) and $H_2$ recovery (by e.g. loading $H_2$-carrier materials).

In an alternative embodiment, reactive gases such as $H_2$ and hydrocarbons are directly applied to the flame such as the "combustion gas" $O_2$ or $N_2O$.

Preferably, the $O_2$ concentration in the off-gas is below 100 ppm; particular preferably below 10 ppm.

In general, the molar hydrogen content in the off gas is at least double, more preferably at least 5 times, most preferably at least 20 times the molar metal content in the off gas.

In an advantageous embodiment, the oxygen-containing gas is air. In a further advantageous embodiment, the oxygen-containing gas is commercial available oxygen (e.g. technical grade oxygen). In a further advantageous embodiment, the oxygen-containing gas is a gaseous compound containing oxygen (e.g. $N_2O$).

"Combustible precursor solutions" suitable for FSP methods as described herein are known and are described e.g. for the manufacture of metal oxides using FSP. Such precursor solutions comprise one or more metal comprising compounds ("precursor") and optionally one or more combustible solvents. The precursors in general are metal comprising compounds which are soluble in combustible solvents. The precursors include organometallic compounds, metal salts and metal complexes such as 2-ethylhexanoates, carboxylates, halogenides, cyclopentadiens and the like. The precursors used are preferably combustable organometallic compounds or oily solutions of metals as well as oil soluble metal complexes and salts and combinations thereof. Examples are metal carboxylates (e.g. iron 2-ethylhexanoate, cobalt 2-ethylhexanoate), metal alkoxides (e.g. aluminium tri-sec-butoxide, tantalum butoxide), metal triethanolamines, metal glycolates, organically substituted ammonium salts of metal-containing complex anions (e.g. anilinium salt of tungstic acid), metal halides, cyclopentadienyl-containing metal complexes such as cyclopentadienyl-Co—$(CO)_2$ and/or carbon monoxide containing metal compounds such as nitroso-cobalt tricarbonyl $Co(CO)_3NO$ and others. The precursors may be diluted with a suitable combustable solvent of low viscosity or heated in order to reach a viscosity of at most 100 mPas, preferably at most 40 mPas, more preferably at most 20 mPas. A low viscosity is regarded advantageously, as it allows an easy spraying of the fluid. Provided that the viscosity can be reduced to a good sprayable one, liquid precursors can be directly used, i.e. without additional solvent.

Thus, in one embodiment, the combustible liquid precursor solution only consists of one or more metal comprising compounds.

In an alternative embodiment, the combustible liquid precursor solution comprises one or more metal comprising compounds and one or more solvents. Suitable solvents, which also act as fuels, are known to the skilled person. The selection of appropriate solvent(s) is inter alia dependent on its soot forming characteristics in reducing environment and its dissolution abilities and its viscosity. Suitable viscosity reducing solvents may comprise one or more acids. While viscosity reducing solvents may consist of one or more acids, often 50% w/w total acid(s) or less may be used and in some cases acids are neither needed nor desired. Preferred solvents include ethers, such as tetrahydrofuran (thf); aliphatic, linear or branched unsubstituted hydrocarbons, preferably with 1-10 C-atoms such as hexane and carboxylic acids with 1-10 C-atoms such as 2-ethylhexanoic acid. Particular preference is given to thf due to its good solvent properties and the low soot formation during combustion. Aromatic hydrocarbons and long chain aliphatic hydrocarbons proved to be less suitable, unless specific carbides or carbon layers are desired.

It was found that some reaction parameters, such as reaction time, reaction temperature and fuel-oxygen-equivalence, influence the method according to the invention. Reaction times for the method according to the invention may vary. Generally, short reaction times, e.g. below 1 second, are preferred. Reaction temperatures for the method according to the invention may vary and are within the typical range of FSP processes. Advantageously, the temperature is above 800° C. within a burning flame (maximal temperature within a specific flame), preferably at least 1000° C., more preferred at least 1300° C. The fuel-oxygen equivalence is generally above 1; advantageously between 1 and 3.0, preferably 1.5-3; most preferably between 2.0 and 3.0. It is believed that this ratio provides a reductive atmosphere allowing formation of the powders as described above.

It is believed that the main difference in the present method compared to the known methods is the incorporation of a flame reactor, in particular the flame of said reactor, in a protecting/reducing gas environment thereby. This enables the preparation of reduced compounds such as metals, non-oxidic ceramics and reduced metal oxides. Advantageously the whole path, i.e. from the spray nozzle/burner tip to the particle collector is shielded from ambient air. In order to prevent any environmental oxygen from coming close to the flame, it is preferred to shield the flame. This may be accomplished by incorporating it in an airtight box. Alternatively, this may be accomplished by incorporating into a cylindrical tube.

In a specific embodiment of the present invention an additional porous tube around the flame is applied to influence and stabilize the production. Through the porous tube additional, optimally reactive gases as coolant/reacting gas can be applied to influence the gas phase thermodynamics within the flame. In one embodiment, $CO_2$ is applied. It is believed that this avoids the production of soot by shifting the Boudouard equilibrium ($CO_2+C \leftarrow\rightarrow 2CO$). In another embodiment, carbon containing gases (such as methane, ethane, acetylene or propane) are applied. This can be used for the production of metal carbides and carbon coated materials. In yet another embodiment, nitrogen containing gases (such as ammonia or nitrogen) are applied. This can be used for the production of metal nitrides.

In one embodiment, the energy produced by FSP process as described herein is uses for a gas/steam turbine.

In a further embodiment, the FSP process as described herein is also used for the synthesis of syngas (hydrogen/CO).

In an additional step it is possible to separate $H_2$ and/or CO from the off gas and to purify them, e.g. over suitable adsorption/desorption zeolites.

In the scope of the present invention it could be shown that the combustion stochiometry is of importance in order to get the desired products. It is in particular important that there is not enough oxygen present for full combustion of the fuel (mainly carboxylic acids, aromatics and THF). In a preferred embodiment, the process conditions are such that the fuel combustion product consists mainly of CO and $H_2$ leading to a strongly reducing atmosphere. This allows for the production of metals and avoids oxidation of the produced metals and avoids soot production and powder contamination.

Also of importance is the flame atmosphere. For example at ambient air concentrations (20% $O_2$) the materials produced by a standard FSP process are highly stable and fully oxidized ceramic powders with very high surface areas. When decreasing the oxygen concentration to below 0.1% (volume/volume), novel phases such as reduced metal oxides (e.g. wustite, molybdenum(IV) oxide) can be produced. At even lower oxygen concentrations (below 100 ppm) there is not sufficient oxygen present in the flame for oxidation of the metal to the corresponding oxides or thermodynamically most favourable oxides, and therefore metallic particles or non-oxidic ceramics are produced.

In a preferred embodiment, the combustion of hydrocarbons (more specifically the C—H bonds present in the solvent or metal comprising compound) is the major source of energy in the method as described herein.

In a further embodiment, the invention relates to a method for the production of metals or alloys, such as cobalt, iron, copper, nickel, in particular fcc cobalt, wherein said method comprises flame spray pyrolysis (FSP) of one or more precursor solution containing combustible metal(s), and wherein said method being performed in an atmosphere with an $O_2$ concentration below 100 ppm (volume/volume) measured in the off-gas and wherein said method being performed using an oxygen-containing gas as oxidizing agent and wherein the obtained powder is optionally subjected to a sintering step with a sintering temperature of at least 40%, preferably 50-70% of the metal melting point. The thus obtained nanocrystalline metal materials are novel and subject to the present invention. Such nanocrystalline metals may be used as coating of wear-resistant materials and high-wear tools.

In a further embodiment the invention relates to a method as described herein wherein one or more metal comprising compounds selected from the group of Cu, Ag, Fe, Co, Mo, Bi, W, preferably Cu, are used and wherein the combustible solvent is selected from aliphatic or cyclic compounds, avoiding aromatics and long aliphatic chains (>C8), and are preferably selected from tetrahydrofurane (THF), short carboxylic acids (e.g. 2-ethylcarboxyc acid) and the metal salts of short carboxylic acids (e.g. copper 2-ethylhexanoate) and wherein the fuel-oxygen equivalence ratio is between 1.0-2.0. As analysis confirms, carbon-coated metal powders are obtained. The thus obtained powders are novel and also subject to the present invention. After compaction, such powders have a negative temperature coefficient linearized between 30 and 100° C. of at least 3500 K, more preferably at least 4000 K and most preferably at least 4500 K. Further, such powders may be used as sensor material in temperature and/or pressure sensitive materials.

In a further embodiment, the invention relates to a method for the production of metal/ceramic nanocomposites, wherein said method comprises flame spray pyrolysis (FSP) of a combustible solution comprising at least two metals; at least one which can be reduced in the flame (reduction potential above −0.42 V as defined by Riedel) such as e.g. bismuth, cobalt, copper, iron, silver, gold, nickel and others and mixtures thereof and at least one metal which can not be reduced in the flame (standard potential below −1.00 V as defined by Riedel) such as e.g. cerium, titanium, silicon, zirconium, yttrium, magnesium, aluminium and others and mixtures thereof and wherein said method being performed in an atmosphere with an $O_2$ concentration below 100 ppm (volume/ volume) measured in the off-gas and wherein said method being performed using an oxygen-containing gas as oxidizing agent and wherein $N_2$ is applied to the flame. The thus obtained metal/ceramic nanocomposites are novel and subject to the present invention. Preferred metal/ceramic nanocomposites are bismuth/ceria nanocomposites. The metal/ceramic composites consist of ceramic and metal particles, where the number averaged primary particle size of the ceramic particles and the number averaged primary particle size of the metal particles are both below 300 nm and both individual particle size distributions evaluated from transmission electron microscopy images have geometric standard deviations of below 1.6, more preferably below 1.4. After compaction and/or heat treatment to temperatures below the melting point of the metal, the composites show metallic conductivity and reflectivity and a Vickers hardness of at least twice, more preferably at least 4 times and most preferably at least 7 times the Vickers hardness of the pure coarse-grained bulk metal. Such metal/ceramic nanocomposites may be used in electrical elements for an enhanced thermoelectric effect or in metals and alloys with enhanced mechanical, optical, magnetic, electronic or chemical properties.

In a further embodiment, the invention relates to a method for the production of metal powders, non-oxidic ceramic powders and reduced metal oxide powders as well as mixtures and alloys thereof, wherein the powders are synthesized by flame spray pyrolysis (FSP) of a combustible precursor solution, said method being performed in an atmosphere with an $O_2$ concentration below 1000 ppm (volume/volume) measured in the off-gas.

In a second aspect, the invention relates to an specifically adapted apparatus for FSP synthesis ("FSP apparatus").

FSP apparatus are known and usually comprise one or more burner(s), devices for supplying the burner(s) (e.g. liquid pumps, gas feeding) and devices for collecting the obtained powder (e.g. a filter). Such devices are known in the field. According to this invention, the flame of said burner is shielded from environmental air. This may be accomplished by use of an airtight box or by use of a cylindrical tube.

Thus, in one embodiment, the invention relates to an FSP apparatus wherein burner, flame and collecting device are located in a (completely) closed room or container filled with an inert or reducing gas (such as $N_2$, Ar, He, $H_2$, CO and mixtures thereof).

In an alternative embodiment, the flame is shielded from environmental air by using a porous tube, e.g. a porous sinter-metal porous graphite or a porous silicium-carbide tube preferably a porous sinter-metal tube.

In an alternative embodiment, the flame is shielded from environmental air by using a non-porous ("tight") tube. In some cases, this set-up results in thermophoretically driven particle deposition, powder loss and inhomogenity and is therefore less preferred.

Figure 3:
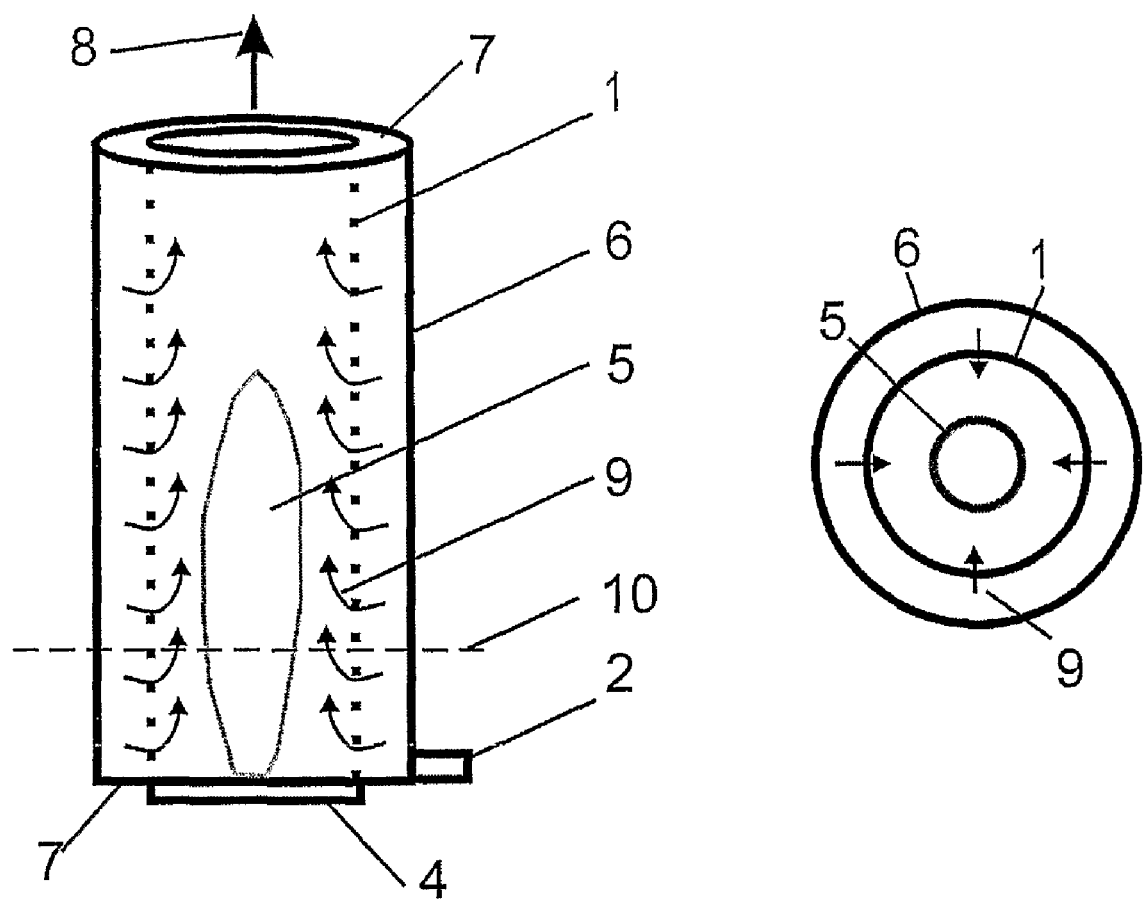

In an advantageous embodiment, the flame is shielded from environmental air by using a tube comprising a porous inner tube and distant there from a tight outer tube. Such a setup is shown in FIG. 3. Using such a tube additional inert and/or reactive gases may be applied to the flame as described below. This set-up allows the continuous production of non-oxidic ceramic powders or reduced metal oxide powders of high quality by providing an aerodynamically designed tubular reactor. It is believed that the radial inflow of coolant/ reactant gases avoids the deposition of any powder on the inner wall of the tube.

In a further embodiment, the invention relates to an FSP apparatus wherein the flame is shielded from environmental air by a device which also allows radial application of gases.

Such device preferably comprises a porous cylindrical tube. Such device also gives the possibility of introducing other gases to the flame atmosphere.

Such gases may be used to shift the Boudouard equilibrium and therefore control the formation or amount of soot on or in the product.

Further, such gases may be reactive gases ($CO_2$, CO, $H_2$, $NH_3$, $CH_4$, $H_2S$, etc.) as well as metal and semi-metal containing gases (e.g. $H_2Se$, $H_2Te$, $B_2H_6$, $SiH_4$, $(CH_3)SiH_3$, $(CH_3)_2SiH_2$ $(CH_3)_3SiH$, $(CH_3)_4Si$) and organic compounds and monomers (butadiene, ethylene, ethane, acetylene, propane, etc). Such gases influence the properties of the flame and/or of the powders obtained. For example, monomers may lead to polymer layers protecting the powders, other compounds may lead to coatings altering the electronic, magnetic or chemical properties of the powders.

Further, previously evaporated liquids such as liquids selected from the group comprising of acrylonitril, siloxanes (e.g. hexamethyldisiloxane, hexamethyldisilazane, tetramethoxysilan, tetraethoxysilan), titanium-tetraisopropoxide and mixtures thereof may be applied to the flame. Such liquids influence the properties of the flame and/or of the powders obtained. For example, the formation of polymer- or ceramic coated particles is possible. Such coatings protect the powders obtained or alter the electronic, magnetic or chemical properties of the powders obtained.

Also encompassed in the invention are mixtures of the above mentioned gases/liquids and devices allowing the application of such mixtures.

The "porous tube" referred to in this specification may be made of any material which is resistant to the reaction conditions and inert towards the starting materials/produced powders. Examples are sintered, porous steel and porous ceramic material, preferably silicium carbide. Further, said porous tube has an inner diameter of at least 2 cm and a length of at least 5 cm as well as a ratio between the height and the inner diameter of at least 2.0.

In an advantageous embodiment, the FSP apparatus as described herein is connected to a gas/steam turbine wherein the off-gases of said FSP apparatus are used to operate said gas/steam turbine. The combination of an FSP apparatus and a gas/steam turbine allows efficient use of the off gasses for energy production. Such gas/steam turbines are known, and may be adapted to the size of the FSP apparatus. Alternatively, the FSP off-gasses are only part of the gasses feed into the gas/steam turbine.

In a third aspect, the invention relates to new materials obtainable by a process as described herein. Such materials exhibit specific new or improved properties. Such materials include un-agglomerated, air-stable copper or cobalt powder of narrow size distribution, metals coated with carbon, metal/ceramic composites (Such as $Bi/CeO_2$ composites).

A first group of compounds obtainable according to a method of this invention are metal-oxides with oxygen content lower than the oxygen content that is considered as thermodynamically stable at room temperature in air. Examples are reduced titanium(III-IV)oxides, cerium(III-IV)oxides, iron(II) oxide, cobalt(II) oxide, molybdenum(IV) oxide, tungsten(IV) oxide. Thus, the inventive method allows the production of reduced metal oxides, e.g. $TiO_{2-x}$, FeO, $MoO_2$, $WO_2$, CoO, $COAlO_x$ in high phase purity. Such materials have e.g. applications in semiconductor technology, as solid-oxide fuel cell materials, as diode materials, as switches and sensor and as pigments.

A further group of compounds obtainable according to a method of this invention are metal powders which are coated by a protecting layer of elements and compounds of elements of the non-metals of the second or third period of the periodic table, especially carbon and silicon containing compounds.

A further group of compounds obtainable according to a method of this invention are metals and metal alloys or composite oxide/metal compounds with a standard potential between +0.52 eV and −0.41 eV as defined in Riedel 1999.

With the method of the present invention metallic powders can be produced that gain at least 70%, preferably at least 90%, most preferred at least 98% of the weight which corresponds to a full oxidation of the pure metal to the corresponding thermodynamically stable oxide upon a treatment consisting of a 1 hour oxidation in ambient air at 800° C.

Particles that are obtainable by the method of the present invention are e.g. metallic particles of a metal or an alloy containing a metal with a standard potential between +0.52 eV and −0.80 eV, preferably +0.15 eV and −0.80 eV, most preferred −0.13 eV and −0.80 eV (all as defined by Riedel).

While it is possible without specific provisions to prepare particles with down to −0.42 eV, specific care must be taken to keep the $O_2$ level low if a metal with a potential lower than −0.42 eV shall be processed. Thus, in view of procedural economy, metals with standard potential between +0.52 eV and −0.42 eV, preferably +0.15 eV and −0.42 eV, especially −0.13 eV and −0.42 eV (all as defined by Riedel) are preferably used in the inventive method. The method is especially applicable to metals with a redox potential >Fe, e.g. Co, Cu, Bi, W, Mo, Ni, Pb, as well as mixtures and alloys thereof. Such materials have e.g. applications in hard and soft magnetic materials, as electric conductivity and temperature conductivity increasing materials in liquids, polymers and ceramics, as building blocks for wires, switches and sensors as well as for uses in powder metallurgy.

A further group of compounds obtainable according to a method of this invention are non-oxidic ceramic powders. In a preferred embodiment of the present invention, the inventive method is used for obtaining non-oxidic ceramic powders containing a transition metal, especially a transition metal selected from the group comprising tungsten, molybdenum, cobalt, nickel, chromium and mixtures thereof, and non-metallic elements from the group comprising boron, carbon, nitrogen, phosphorus, sulphur, silicon, arsenic, antimony, germanium and mixtures thereof. Non-oxidic ceramic particles obtainable by the inventive method are in particular transition metal carbides, nitrides, sulfides, silicides, selenides, tellurides, borides.

Inventive particles of tungsten carbide (WC or $W_2C$) and metallic copper can be used as materials in high voltage contacts, and WC or $W_2C$ is suitable as platinum catalyst substitute, e.g. in hydrogenation reactions.

A further group of compounds according to this invention encompasses mixtures, alloys and composites of materials directly obtainable from the above method and mixtures and composites of materials obtainable with the inventive method and any metal-oxide. Thus, particles further obtainable by the inventive method are composites of materials as defined above as well as metal oxides, polymers and carbon, including particles that are composites in a core-shell type structure. In one embodiment of the inventive method nanoparticles are obtainable that are metallic particles covered with an inert layer, in particular with a thin carbon layer.

Also preferred embodiments of the present invention are alloys containing among others, bismuth, silver and copper.

It is also possible to directly produce mixed materials, e.g. metallic iron and $ZrO_2$ or metallic bismuth and $CeO_2$ etc., i.e. a mixture of metal particles and ceramic particles. By such a procedure, the material characteristic can be well directed, e.g. predominantly ceramic or predominantly metallic.

The volume-surface-average diameter (as defined in Janssen 1994) of the particles obtainable with the inventive method is lower than 300 nm, preferably below 100 nm, much preferred below 50 nm. The volume-surface-average diameter, $d_p$, can be calculated from the specific surface area assuming spherical particles as $d_p=6/(\rho*SA)$, where $\rho$ is the density of the material (kg/m$^3$) and SA is the specific surface area (m$^2$/kg). The method of the present invention allows producing powders with volume-surface average diameters in the nano-scale, in particular below 300 nm. Thus, the invention provides nanoparticles having a volume-surface-average diameter as defined in Janssen 1994 below 300 nm, preferably below 100 nm, much preferred below 50 nm.

In addition, the nano-powders of the present invention in general have very narrow size distributions measured as geometric standard deviation $\sigma_g$ according to Grass and Stark (2005). The hydrodynamic particle size distribution is measured from a stable colloid suspension using an X-ray disc centrifuge such as a BI-XDC from Brookhaven Instruments. The geometric standard deviation is calculated by fitting a log-normal distribution to the measured data using the least-squares method. The geometric standard deviation $\sigma_g$ preferably is below 1.6, much preferred below 1.4. Without being bound to theory, this narrow size distribution may be attributed to a turbulent flame process (Vemury and Pratsinis 1995, Grass and Stark 2005). Depending on the sintering characteristics of the material the produced powders can be spherical, e.g. in the case of cobalt, or strongly agglomerated, e.g. in the case of copper and bismuth.

By the method of the present invention several different materials can be produced and even the material characteristics controlled and adapted. It is e.g. possible to produce metal particles that have a "clean", metallic surface or that are covered by e.g. a carbon layer. Specific materials and composites as well as some of their uses are identified below. These materials are new and encompassed by the present invention:

(1) Carbon coated copper: A carbon layer protects the metal from oxidation at ambient temperature and from sintering. If e.g. one form of the carbon coated copper (Cu/C) is formed into a pill, its conductivity is temperature and pressure dependent, thus making it a highly interesting material for applications in pressure/temperature sensors. If treated with e.g. HNO$_3$, the copper may be removed, leaving a light weight carbon product with open pores. Another form of the inventive Cu/C can be dispersed in ethanol resulting in an ink suitable for the production of printed circuits, namely in that after application and drying the carbon is removed, e.g. by a high temperature procedure under CO$_2$, and the copper then is e.g. laser sintered.

(2) Copper (without carbon): Cu can be used to enhance the conductivity (heat and electricity) of polymers and liquids such as e.g. ethylene glycol or silicon oils in heat exchangers or in contact pastes.

(3) Metallic Bi nanoparticles alloys and composites, optionally with an oxide compound such as ZrO$_2$ or CeO$_2$ as dopant, can be used as photomascs, in that the originally opaque layer is laser sintered to give a transparent layer in desired regions as well as in thermo-electric materials.

(4) The direct production of steel is also an application of the method of the present invention, whereby the alloying metals, e.g. Co, Ni etc. are injected together with the iron, preferably dissolved in the same precursor solution, leading to a product with very small grains.

(5) Low melting materials, such as Bi, Cu and Ag alloys may be used for soldering in electronics or Babbitt bearings, since due to the small particle size the product is much better melting and lubricating.

(6) Oxide dispersed steel (ODS), i.e. steels of different composition, may be manufactured using the method of this invention. Due to about 1% Y$_2$O$_3$ such materials have a high load resistance.

In a further aspect, the present invention relates to the use of the powders obtained by a method as described herein.

The powders obtained by a process as described herein may be used in a wide range of technical applications. These uses include applications for powder metallurgy, as materials with enhanced electronic, magnetic and/or mechanical properties, especially for use as conductivity increasing materials in fluids, polymers or ceramics, as hard or soft magnetic materials for magnets or transformers, as building blocks for wires, sensor or switches in the electronic industry and as raw product for powder metallurgy in the machining industry and as low melting alloys for interconnects in electronics. Further uses of powders of the present invention are as reactive surfaces, as ceramics, building materials and in heterogeneous catalysis.

Specific uses of the materials obtainable according to a method as described herein are identified below:

(1) Reduced metal oxide powders of the present invention can be used in pigments for paints, inks or in cosmetic applications, or in semi-conducting materials, or in sensors, or in diodes in electronic applications or in solid state fuel cells.

(2) Non-oxidic ceramic powders of the present invention, in particular tungsten-carbide, cobalt nitride, molybdenum carbide, molybdenum, tungsten, can be used in high duty applications such as cutting and drilling tools and protective coatings.

(3) Metal powders of the present invention, in particular iron, steel, copper, cobalt and tungsten can be used as materials with enhanced electronic, magnetic and/or mechanical properties, especially for use as conductivity increasing materials in fluids, polymers or ceramics, or for use as hard or soft magnetic materials for magnets or transformers or coil cores, or for use as building blocks for wires, sensor or switches in the electronic industry and as raw product for powder metallurgy in the machining industry and as low melting alloys for interconnects in electronics.

(4) Alloys containing among others bismuth, silver and copper, especially low melting alloys, may be used as interconnects for electronics.

(5) Materials obtainable by the method of the present invention may be used in catalysis, including platinum-like catalysis and hydrodenitrogenation. A specific use for tungsten-carbide is in platinum-like catalysis such as hydrogenation and metal nitrides as well as alloys of metal nitrides for hydrodenitrogenation.

(6) Metal ceramic composites can be used for materials with increased mechanical properties and sintered nanocrystalline bulk materials with increased mechanical properties for use as wear resistant materials and coatings in cutting, drilling and machining applications.

(7) Fcc Cobalt manufactured by a method as described herein may be used for sinter resistant, high wear materials/coatings.

(8) Particles of Co, Fe and other metals/alloys with similar magnetic features coated with carbon manufactured by a method as described herein may be used in combination with polymers for the preparation of polymer based magnets for use in electronics as e.g. electronic motors or generators and for the preparation of magnetic glues (9) Bi/ceramic nanocomposites manufactured by a method as described herein may be used for manufacturing of thermoelectric elements.

(10) Co, Fe and other metals/alloys with similar features may be used in electronic/magnetic applications such as re-writable data carriers, e.g. hard discs.

(11) Co, Fe and other metals/alloys with similar features coated by carbon layers may be used for separation techniques.

(12) Alloys containing amongst others lead, copper, tin, antimony and bismuth for may be used for the fabrication of Babbitt bearings.

EXAMPLES

The invention is further described by way of examples. All examples consist of 3 steps;
(i) Precursor manufacturing,
(ii) FSP process
(iii) analysis of the obtained powder Powder Analysis: For powder analysis the following measurements were conducted:
- X-ray diffraction (XRD) using a Siemens powder X-ray diffractometer using Ni-filtered $CuK_\alpha$ radiation in step mode with a step size of 0.3°,
- nitrogen adsorption for specific surface area measurements (BET method) preformed on a Micromeritics Tristar,
- transmission electron microscopy (TEM) using a Philips CM30 ST with $LaB_6$ cathode operated at 300 kV, and
- magnetisation measurements using a Superconducting Quantum Interference Device (SQUID; MPMS-5s of QuantumDesign)
- scanning electron microscopy (SEM) using a LEO 1530 Gemeni microscope.
- Electronic resistance/conductivity: Pills with a diameter of 1.3 cm were pressed from selected examples using a uniaxial press at 370 MPa. The electronic resistance of the pills was measured using a multimeter (Voltcraft VC 220). The temperature dependence of the electrical conductivity was measured in a glove box in an oxygen free atmosphere. The method applied is presented in detail in Changyi et al. 2000.

Figure 2:
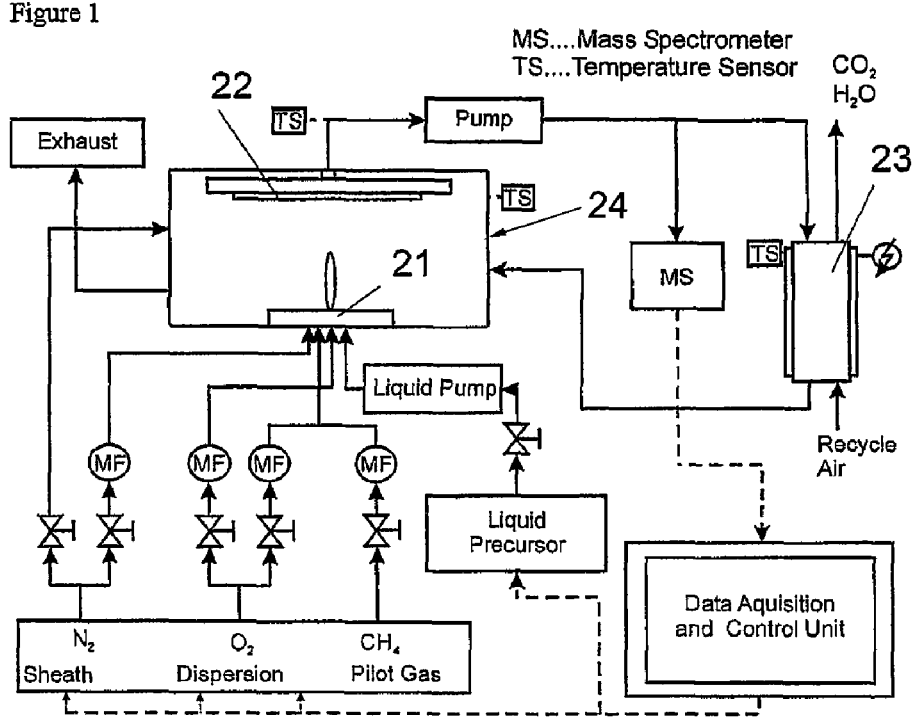
FIG. 2 shows a possible setup as used for example 1-12. A flame spray nozzle 21 as described by Madler et al. (2002) was placed in a glove box 24. The off gas was freed from the powder by a glass-fiber filter 22 and piped into a series of 2 columns 23 filled with zeolite 4A and 13X, respectively, for the removal of water and carbon dioxide.

General Experimental Procedure and Set-up: Gas concentrations are given in % volume per volume of gas unless otherwise stated. Reduced powders were produced by flame spray pyrolysis in a laboratory scale setup consisting of an air-assisted nozzle 21 as described in detail by Madler et al. (2002), (e.g. FIG. 1 of said document). Such a nozzle was placed in a glove box 24 in which the atmosphere could be controlled and measured by a mass spectrometer (see FIG. 2). Metal containing liquids (precursor liquids, precursor solutions) were brought into the flame by a micro-gear-ring pump (HNP Mikrosysteme GmbH) at 3-7 ml/min. The flame consisted of a central spray delivery, a premixed circular support flame (diameter 6 mm slit width 150 μm, 2.2 l/min oxygen (PanGas, tech), 1.2 l/min methane (PanGas, tech)) and a circular sheath gas delivery. Oxygen (PanGas, tech) as well as methane (PanGas, tech) at different flow rates were delivered as dispersion gas in all experiments and delivered over a nozzle pressure drop of 1.5 bar. All gas flow rates were controlled by calibrated mass flow controllers (Brooks 5850S). The process conditions for all experiments are outlined in Table 1. The off gas was freed from the powder by a glass fiber filter 22 and piped into a series of two columns 23 filled with zeolite 4A and 13X, respectively, for the removal of water and carbon dioxide. For examples 2, 4, 6, 10, 11, 12, 14 and 15 a porous sinter metal tube was used for better control of the flame conditions. The construction of the tube is outlined in FIG. 3a together with the tube cross section at height 10 shown on the right FIG. 3b. A sinter-metal tube 1 (GKN Sintermetalle, 9366, inner diameter 25 mm, wall thickness 6 mm, Material: 1.4404 R 5 IS, length: 150 mm) was embedded in an aluminium tube 6, closing both ends between the two tubes 7. Cold Gas was introduced by a port 2, flowed through the sinter-metal tube 9, cooled the flame 5 and flowed towards the hood 8. The tube was placed directly on the burner head 4.

Precursors: Metal containing liquid precursors were produced according to the following methods.

Copper precursor I: 90 g Copper-acetat (Fluka, 99%) were dissolved in 500 ml 2-ethylhexanoic acid during 2 hours at 140° C. and water and acetic acid were removed by distillation. The resulting liquid was diluted with THF to give 750 ml of a precursor with a suitably low viscosity.

Copper precursor II: 90 g Copper-acetat (Fluka, 99%) were dissolved in 500 ml 2-ethylhexanoic acid during 2 hours at 140° C. and water and acetic acid were removed by distillation. The resulting liquid was diluted with xylene to give 1000 ml of a precursor with a suitably low viscosity.

Cobalt precursor: 50 g Cobalt-acetat tetrahydrat (Fluka 99% Lot Nr 050392-BS) were dissolved in 280 ml 2-ethylhexanoic acid during 2 hours at 140° C. and water and acetic aced were removed by distillation. The resulting liquid was diluted with THF to give 500 g of a precursor with a suitably low viscosity.

Iron precursor: 50 g Iron naphthenate (80% in mineral spirits; 12% Fe; Strem Lot No B0114082) were diluted with 25 g THF to give a precursor of suitably low viscosity.

Molybdenum precursor: 50 g Molybdenum 2-ethylhexanoate (15% Mo Strem Lot No B0132104) were diluted with 25 g xylene to give a precursor of suitably low viscosity.

Tungsten precursor: Primene JM-T tungstate was prepared according to patent application U.S. Pat. No. 3,290,245A1 example III and diluted 1:1 in mass with xylene.

Bismuth precursor: 50 g Bismuth (III) 2-ethylhexanoate (72% in mineral spirits; ~28% Bi; Strem Lot B7904042) were diluted with 25 g THF to give a precursor of suitably low viscosity.

Reference Material Preparation 1: MoO3 Powder

For reference, 30 ml of the molybdenum precursor were flame sprayed in an air atmosphere (process conditions see Table 1) according to patent application WO2004/103900 giving a greenish powder. XRD confirmed formation of molybdenum(VI) oxide (see FIG. 4,A) with a specific surface area of 75 $m^2/g$.

Reference Material Preparation 2: Cobalt(II,III)oxide Powder

Figure 5:
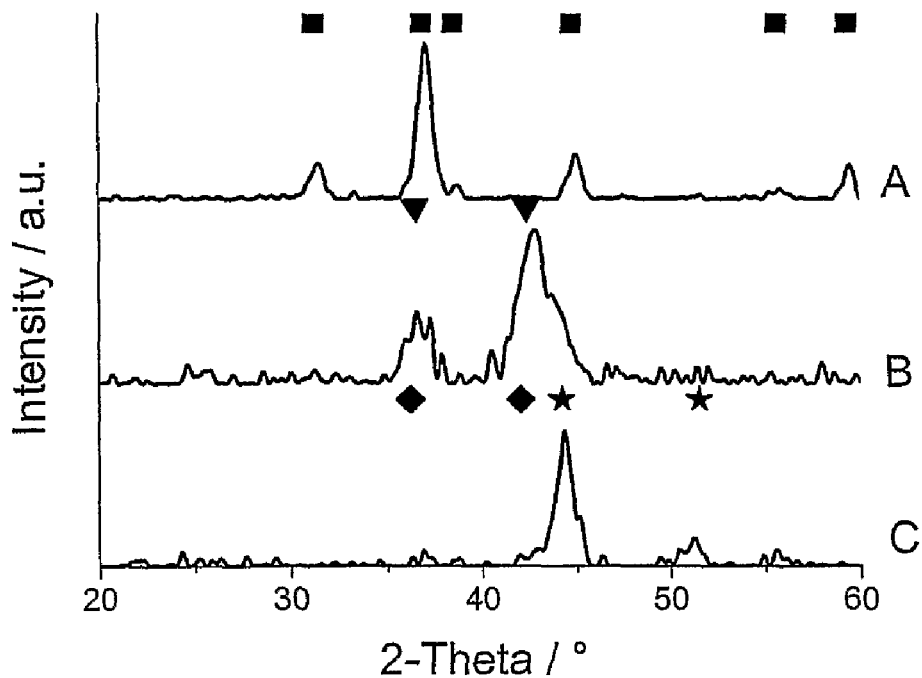
FIG. 5 shows XRD patterns of powders produced in reference 2 (A), example 3 (B) and example 4 (C). Reference peaks are shown as stars (face centred, fcc cobalt), squares (cobalt(II,III)oxide) and triangles (cobalt (II) oxide).

For reference, 30 ml of the cobalt precursor were flame sprayed in an air atmosphere (conditions see Table 1) according to patent application WO2004/103900 giving a black powder. XRD confirms formation of cobalt(II,III)oxide (FIG. 5,A) with a specific surface area of 86 $m^2/g$.

Example 1

(MoO2 powder): 30 ml of the molybdenum precursor were flame sprayed in a nitrogen atmosphere (conditions see Table 1). XRD analysis confirmed formation of molybdenum(IV) oxide (see FIG. 4,B). The powder was of an intense blue colour.

Example 2

(MoO2—Mo composites): 30 ml of the molybdenum precursor were flame sprayed in a nitrogen atmosphere with an oxygen concentration of 100 ppm (conditions see Table 1).

Figure 4:
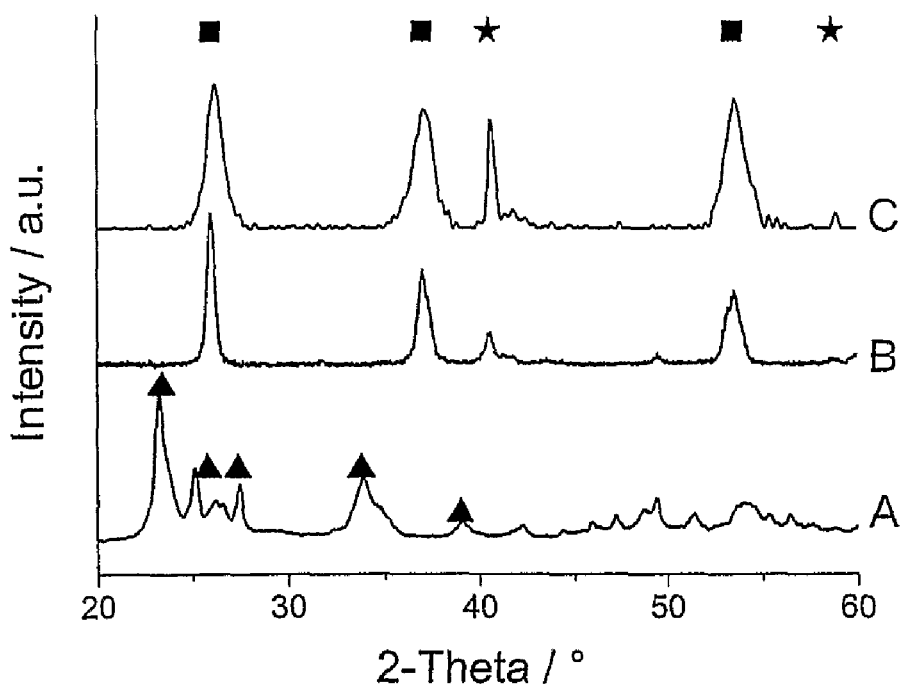
FIG. 4 shows XRD patterns of powders produced in reference 1 and examples 1 and 2 as A, B and C respectively. Reference peaks are shown as stars (molybdenum), squares (molybdenum(IV) oxide) and triangles (molybdenum (VI) oxide).

XRD confirmed the formation of bluish molybdenum(IV) oxide together with smaller amounts of metallic molybdenum (see FIG. 4,C). Upon oxidation in air at 500° C. the powders mass increased by 10% (theoretical Mo→$MoO_3$: 50%) and further confirmed the presence of reduced molybdenum oxides and metallic molybdenum in the as prepared sample. After oxidation the colour turned green.

Example 3

(Cobalt(II) oxide powder): 30 ml of the cobalt precursor were flame sprayed in a nitrogen atmosphere (conditions see Table 1). XRD confirmed formation of cobalt(II) oxide (see FIG. 5,B).

Example 4

Figure 6:
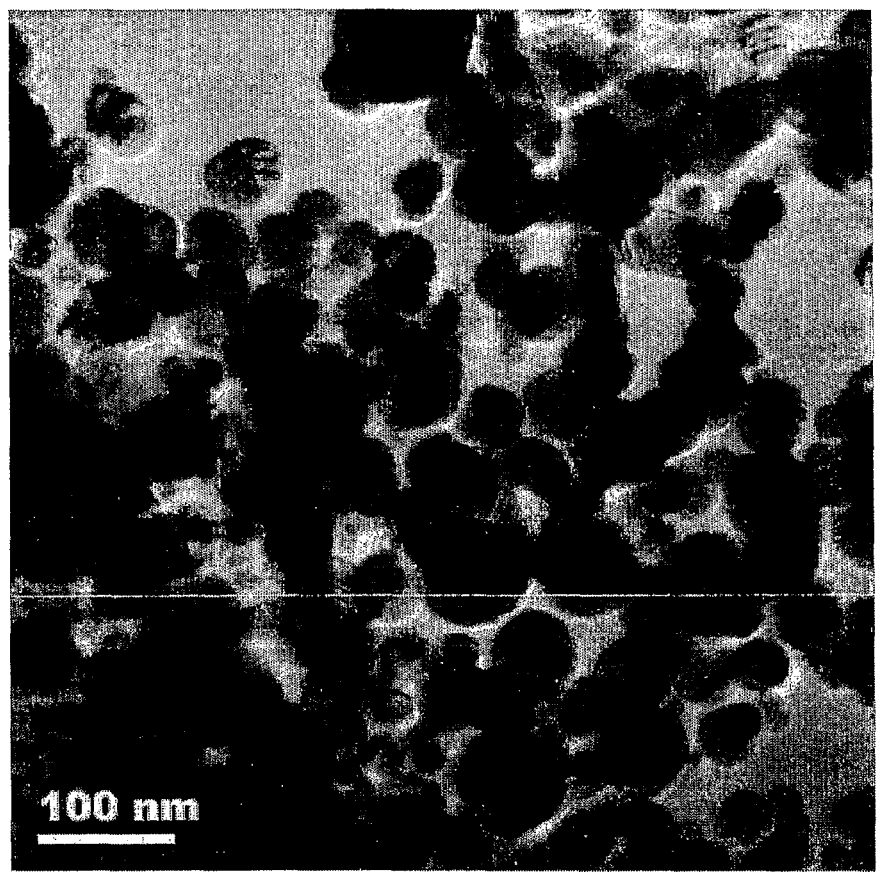
FIG. 6 shows a transmission electron micrograph of the product produced in example 4. Unagglomerated, spherical cobalt particles with a narrow particle size distribution are visible. Some of the particles show the formation of twins or other distortions of the crystal lattice.

(Cobalt nano powder): 30 ml of the cobalt precursor were flame sprayed in a nitrogen atmosphere with an oxygen concentration of less than 100 ppm (conditions see Table 1). The sinter metal tube was used for cooling and reacting of the flame with $CO_2$ (30 l/min, PanGas 4.0). XRD confirmed the formation of metallic cobalt in its face-centered-cubic (fcc) phase (see FIG. 5C). The XRD pattern further shows small peaks which were attributed to cobalt nitride that acts as protecting layer on the surface of the particles. This is further supported by the fact, that the powder proved to be fully inert in air at room temperature. Upon oxidation at 500° C. in air during 1 h the powder mass increased by 33% (theoretical Co→$CO_3O_4$: 36%). The powder with a specific surface area of 14.3 $m^2/g$ had a very narrow size distribution with a geometric standard deviation $\sigma_g$ of below 1.6 as measured according to Grass and Stark 2005. The powder further consisted of spherical non-agglomerated particles further illustrated by the transmission electron micrograph in FIG. 6. When pressed to a pill the powder exhibited a low electronic resistance (below 0.1 Ohm m), strong superparamagentic properties as well as metallic gloss. When the powder was ignited with a flame the powder burned rapidly forming cobalt oxide.

Figure 7:
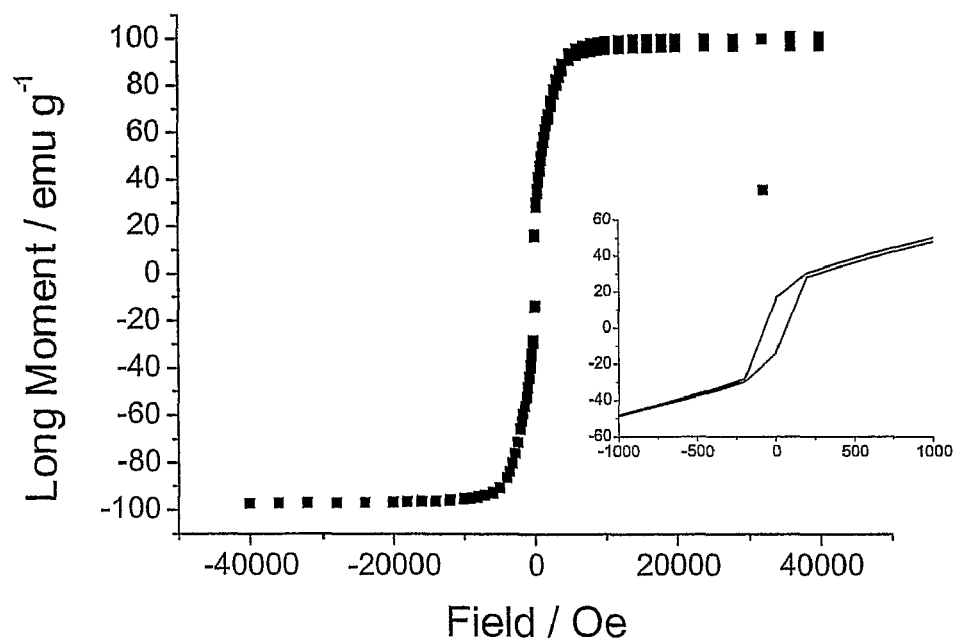
FIG. 7 shows the magnetization curve of the powder produced in example 4 as measured on a superconducting quantum interface device. The inset shows a magnification from −1000 to 1000 Oe showing the hysteresis.

FIG. 7 shows a magnetization curve measured on a Superconducting Quantum Interference Device (SQUID) (MPMS-5S of QuantumDesign) showing that although the powder behaves very soft (coercivity <50 Oe) the achievable saturation magnetization remains high (>120 emu/g).

Example 5

(Wustite-Iron composites): 30 ml of the iron precursor were flame sprayed in a nitrogen atmosphere (conditions see Table 1). XRD (FIG. 8,A) confirmed the formation of wustite (iron(II) oxide) and metallic iron.

Example 6

Figure 8:
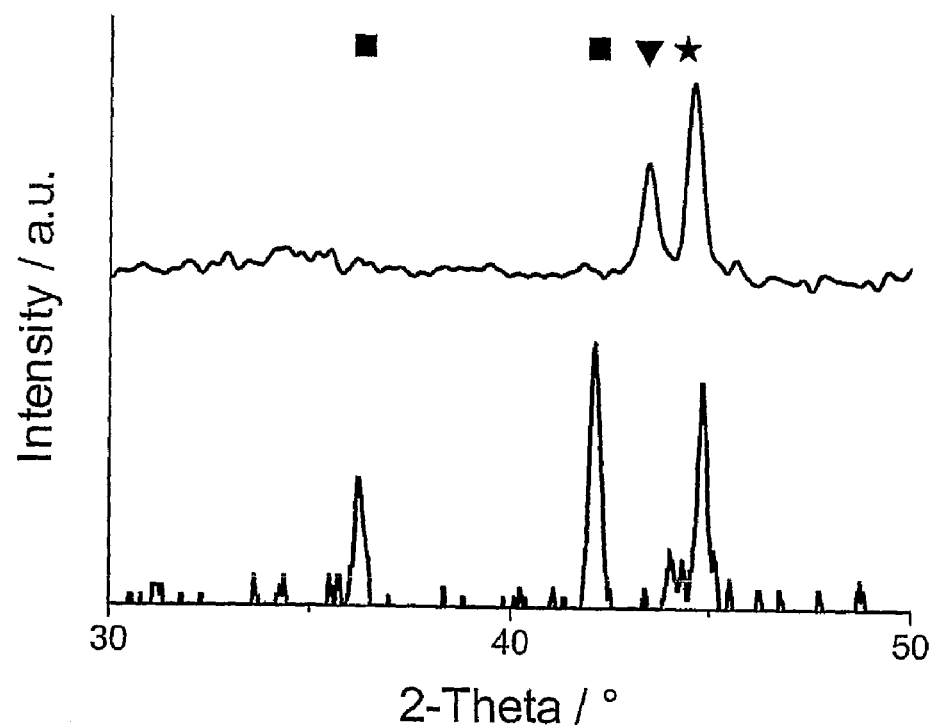
FIG. 8 shows XRD pattern of powders produced in examples 5 (A) and 6 (B). Reference peaks are shown as stars (alpha-iron), as triangles (gamma-iron) as well as squares (iron(II) oxide; Wustite).

(Iron nano powder): 30 ml of the iron precursor were flame sprayed in a nitrogen atmosphere with an oxygen concentration of below 100 ppm (conditions see Table 1). The sinter metal tube was used for cooling of the flame with $N_2$ (30 l/min, PanGas 5.0). XRD confirmed the formation of pure metallic iron (FIG. 8,B). Upon oxidation in air at room temperature the powder weight increased by 2.6% within 5 minutes and remained stable for at least an hour. At 400° C. the powder weight increased by further 25.7% (theoretical Fe→$Fe_2O_3$: 43%). When the powder was ignited with a flame it burned rapidly forming red iron oxide.

Example 7

Figure 9:
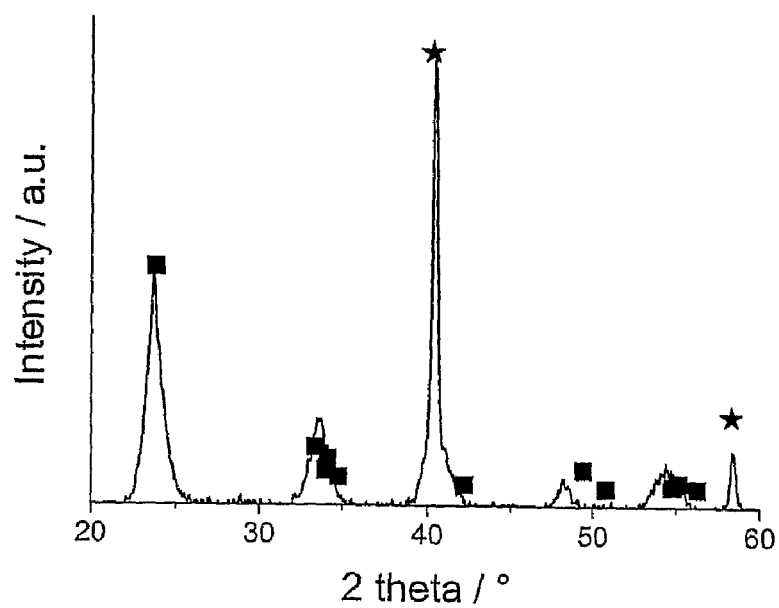
FIG. 9 shows a XRD pattern of the product prepared by example 7. The reference peaks for tungsten is shown as star, the reference peaks for tungsten(VI) oxide are shown as squares.

(Tungsten-Tungsten oxide composites): 30 ml of the tungsten precursor were flame sprayed in a nitrogen atmosphere (conditions see Table 1). The produced powder was a composite of metallic tungsten and tungsten(VI) oxide as could be seen by the XRD pattern as shown in FIG. 9.

Example 8

Figure 11:
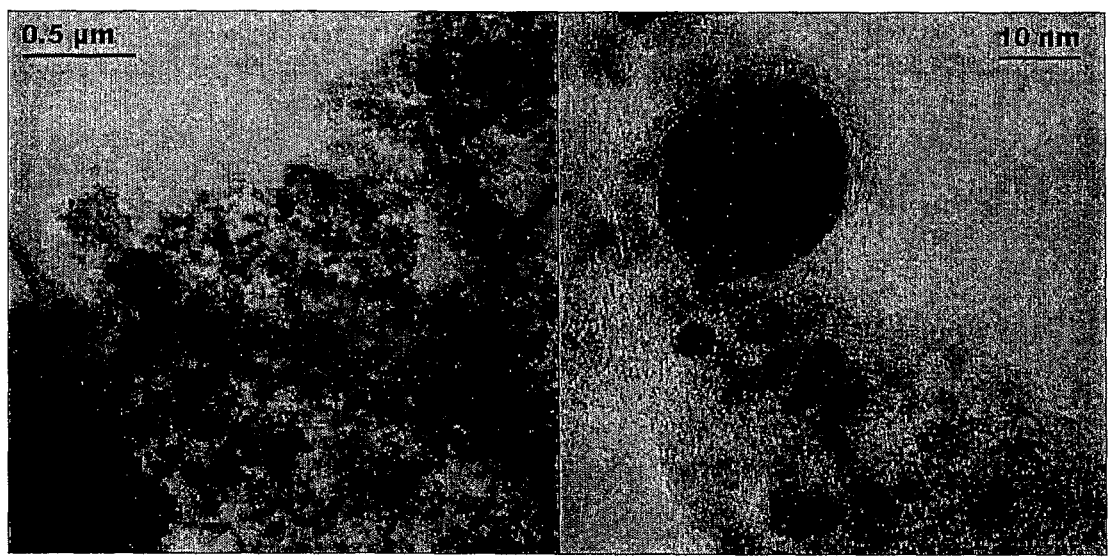
FIG. 11 shows 2 transmission electron micrographs of the powder produced in example 8. Small copper particles are visible which are embedded in a carbon matrix.

(Copper-carbon composites): 30 ml of the copper precursor 2 were flame sprayed in a nitrogen atmosphere (conditions see Table 1). FIG. 11 shows a transmission electron micrograph of the as produced powder. It is clearly visible, that very small copper particles (below 10 nm) were embedded in a graphite matrix. The powder specific surface area was 196 $m^2/g$.

Example 9

Figure 10:
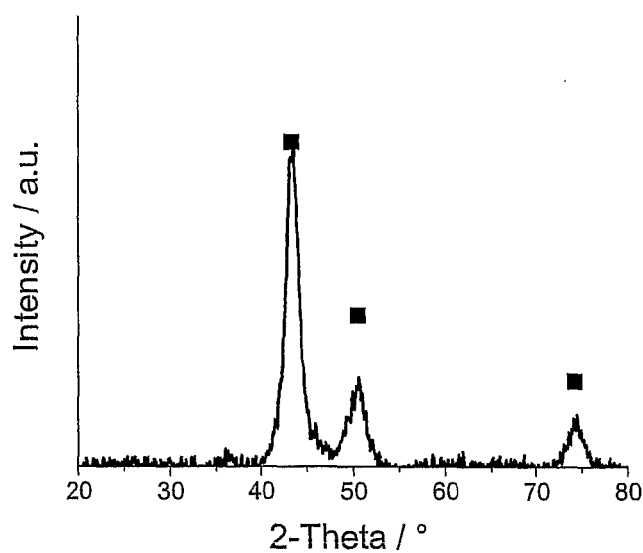
FIG. 10 shows a XRD pattern of example 9 together with reference peaks for copper (squares).
Figure 12:
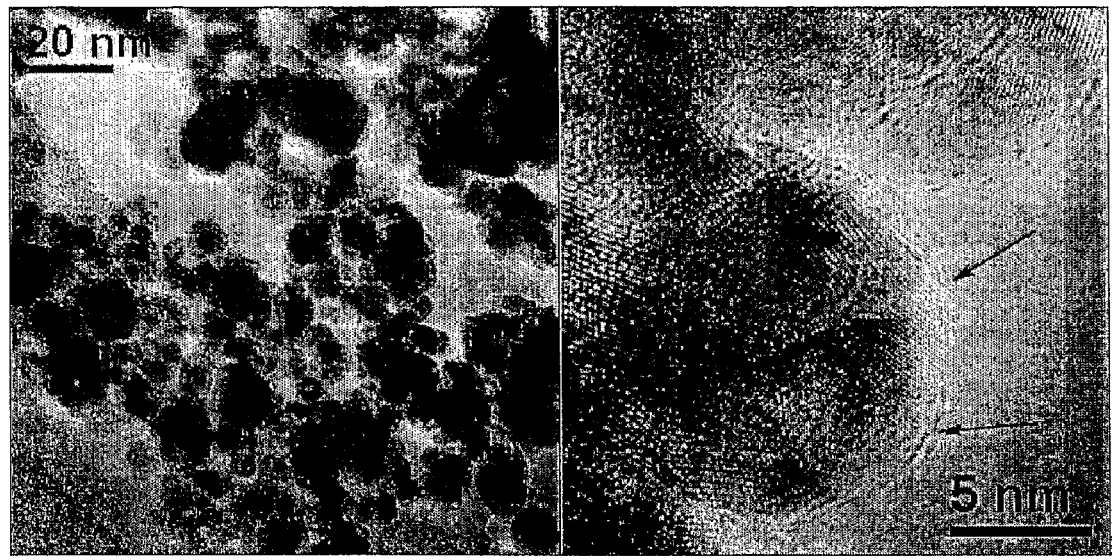
FIG. 12 shows 2 transmission electron micrographs of the powder of example 9. Picture A again shows a small particle size distribution and picture B shows the carbon coating of the copper.
Figure 13:
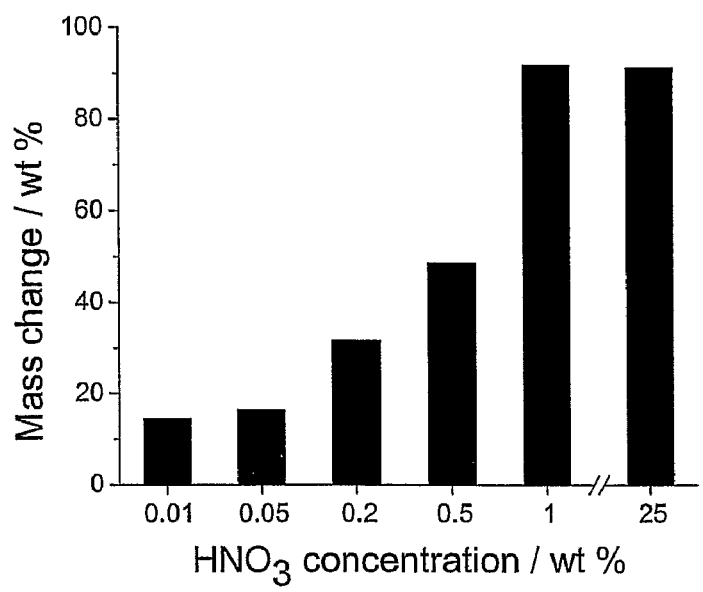
FIG. 13 shows the stability of the powder prepared in example 9 in nitric acid. The mass loss was identified by copper titration by EDTA against Murexide.
Figure 14:
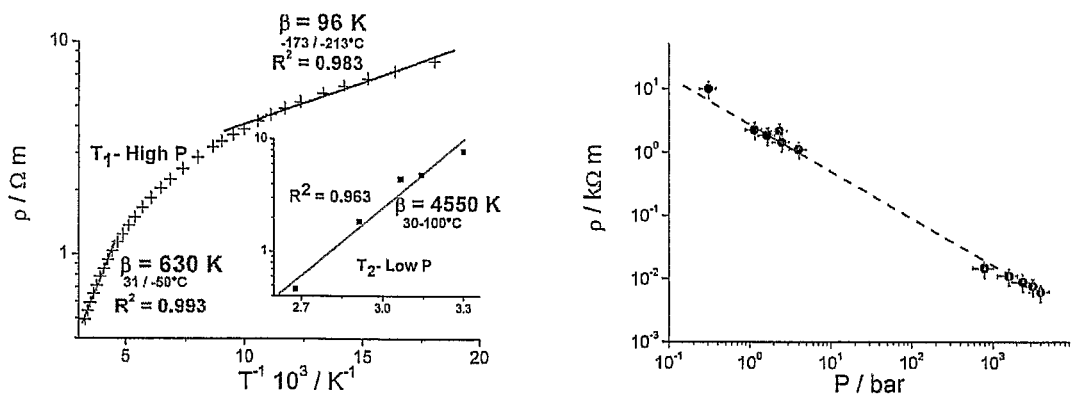
FIG. 14 shows the temperature (left) and pressure (right) dependence of the electronic resistively of a pill prepared from powder synthesized in example 9.

(Copper embedded in carbon nano-containers): 30 ml of the copper precursor 1 were flame sprayed in a nitrogen atmosphere (conditions see Table 1). The powder could be characterized as pure copper by XRD-analysis (FIG. 10). Transmission electron microscopy (FIG. 12) showed that the copper particles were coated by a very thin layer of carbon about 0.5-1 nm thick. This carbon layer was found to give the powder an excellent stability in air and even stability against diluted nitric acid as shown in FIG. 13. When pressed to a pill the black powder exhibited a strongly temperature and pressure dependent electronic resistance with a negative temperature coefficient linearized between 30° C. and 100° C. of >4500 K (FIG. 14).

Example 10

(Copper nano powder): 30 ml of the copper precursor 1 were flame sprayed in a nitrogen atmosphere with an oxygen concentration of 100 ppm (conditions see Table 1). The sinter metal tube was used for cooling of the flame with nitrogen (30 l/min, PanGas 5.0). The resulting powder consisted of pure copper metal: When pressed to a pill (using an uniaxial press at 370 MPa) the powder exhibited an extremely low electronic resistance (less than 0.03 Ohm m) as well as a strong metallic gloss. Upon ignition with a flame the powder burned giving black copper oxide.

Example 11

Figure 15:
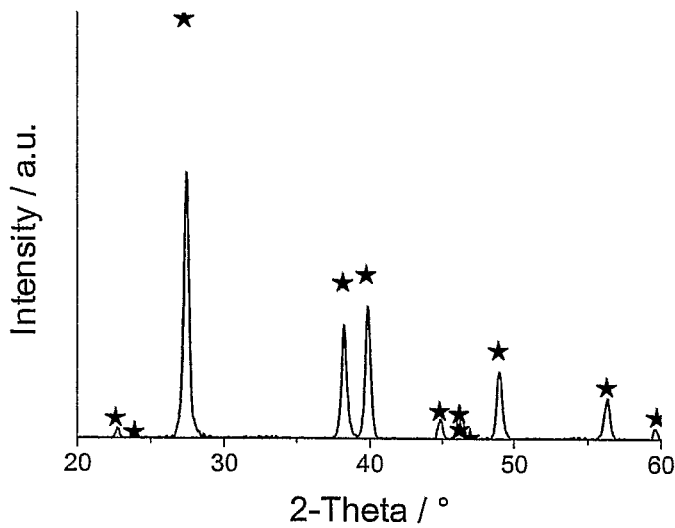
FIG. 15 shows the XRD pattern of the powder produced in example 11 together with the reference peaks for bismuth as stars.

(Bismuth nano powder): 30 ml of the bismuth precursor were flame sprayed in a nitrogen atmosphere (conditions see Table 1). The sinter metal tube was used for cooling of the flame with nitrogen (30 l/min, PanGas 5.0). The XRD pattern of the black powder showed the formation of pure metallic bismuth (FIG. 15). The morphology of the powder was shown by a scanning electron micrograph as presented in FIG. 16. Upon ignition with a flame the powder oxidised to yellow bismuth oxide.

Example 12

Figure 16:
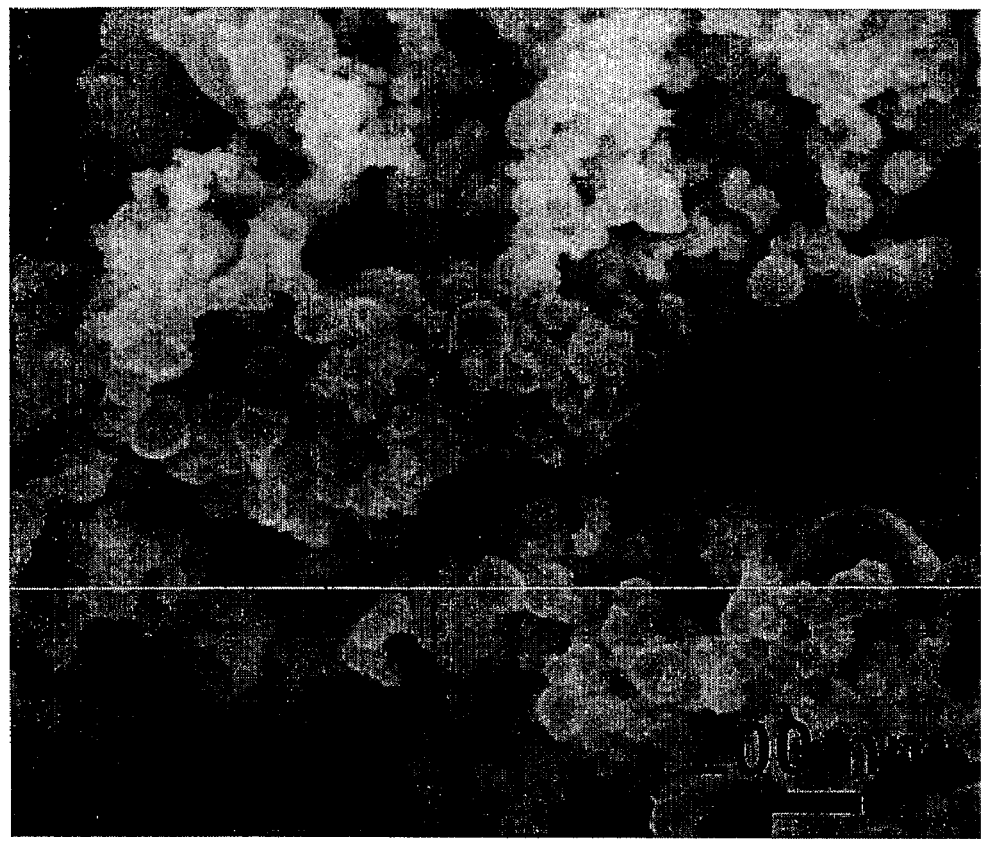
FIG. 16 shows a scanning electron micrograph of the as produced powder of example 11. The particles of 30 nm diameter are strongly agglomerated and very homogeneous in size.
Figure 17:
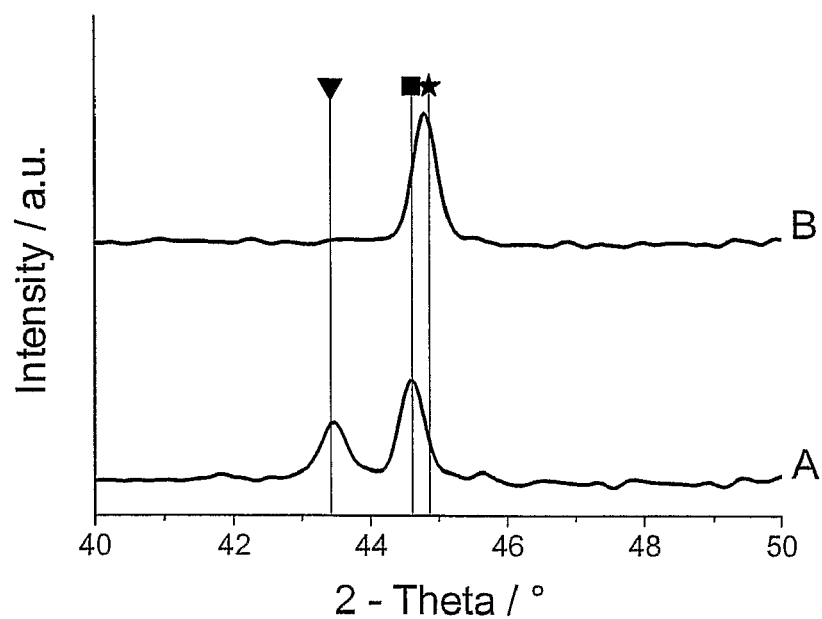
FIG. 17 shows an XRD pattern of the produced powder of examples 12 (B) and 6 (A). Reference peaks for alpha-iron (square), gamma-iron (triangle) and wairauite (CoFe, star) are also shown.

(Iron-Cobalt alloy nano powder): 28.5 g of the iron precursor were mixed with 28.5 g of the cobalt precursor and sprayed in a nitrogen atmosphere (conditions see Table 1). The sinter metal tube was used for cooling of the flame with nitrogen (30 l/min, PanGas 5.0). A small section of the XRD pattern of the as prepared powder is shown in FIG. 16 B. For reference the XRD pattern of example 6 is shown below (FIG. 16 A). It is clearly visible, that the XRD-peak at 2-Theta ~44.3° from alpha-iron is shifted towards larger 2-Theta values. This gives clear evidence that the cobalt (24% wt) is solubilzed in the iron matrix (76% wt) forming an alloy known as Permendur 24. In FIG. 17, the breath of the peaks as well as the SEM micrograph show that the produced grains are of nano-scale dimensions.

Example 13

Figure 18:
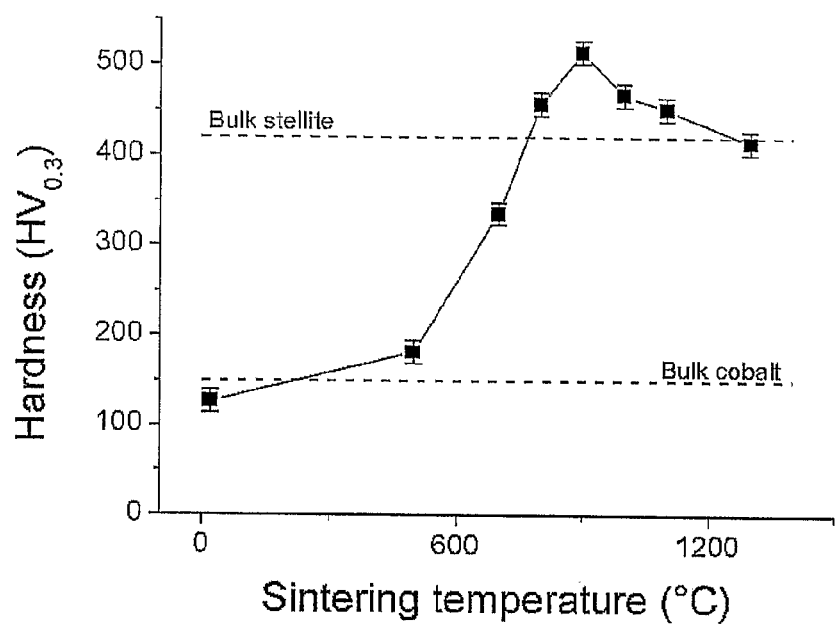
FIG. 18 shows the dependence of the maximum sintering temperature on the Vickers hardness of nanocrystalline cobalt compacts produced following ex. 13 (pressed at 370 MPa). Reference values for bulk cobalt and stellite alloy (Stellite 6: Co-28Cr-4W-1.1C) are shown.
Figure 19:
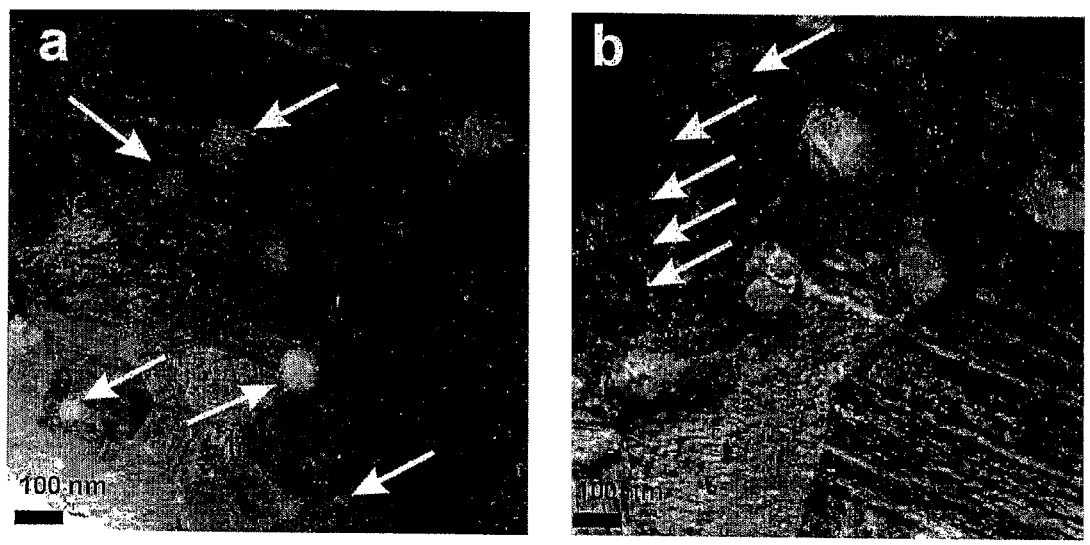
FIG. 19 shows a transmission electron micrograph of a cobalt sample pressed at 370 MPa from nano-cobalt powder (example 13) and sintered at 900° C. in a Hydrargon® atmosphere showing nanocrystalline grains of fcc-cobalt with a high density of nanovoids (indicated by arrows in a) and twin defects (indicated by arrows in b) stabilizing the material and preventing grain growth.

(Sinter resistant fcc cobalt): The cobalt powder manufactured by example 4 was pressed to pills (½ inch diameter) and compacted in a uni-axial press at 370 MPa. The pills were sintered (heating rate: 30 K/min, cooling rate: 30 K/min, time at maximum temperature: 20 minutes) at temperatures between 500 and 1300° C. in a Hydrargon® (7% vol $H_2$ in argon, Pangas) atmosphere. The so prepared materials had a Vickers hardness (FIG. 18, measured by microindenation, load 300 grams on a Wolpert MTX-α) greatly exceeding the hardness of conventionally processed cobalt (~150-220 Vickers) attaining a maximum hardness when sintering at 900° C. (>520 Vickers). Despite the high temperatures applied the materials of >90% relative density maintained their nanocrystalline structure and thermodynamically unfavoured fcc structure (FIG. 19).

Example 14

Figure 20:
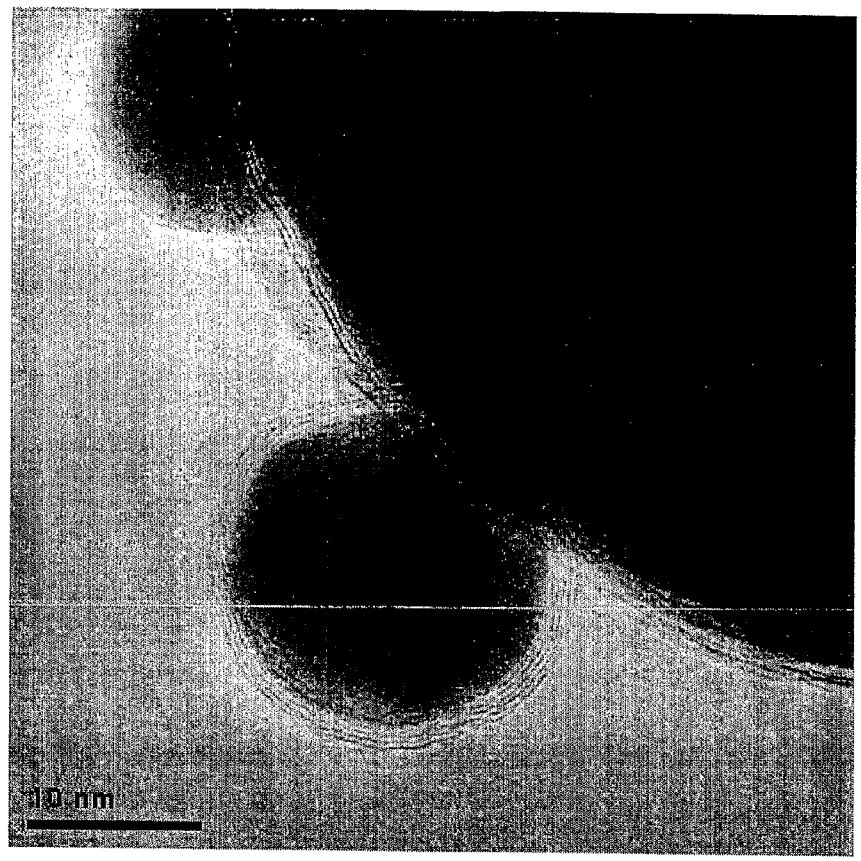
FIG. 20 shows a transmission electron micrograph of a carbon coated cobalt nanopowder (example 14) showing pure metallic cobalt nanoparticles. Each individual nanoparticle is coated by 3-5 graphene layers.

(Carbon coated cobalt powder): 30 ml of the cobalt precursor were flame sprayed in a nitrogen atmosphere (conditions see Table 1). The sinter metal tube was used for cooling of the flame with a mixture of nitrogen (30 l/min, Pan Gas 5.0) and acetylene (5 l/min, PanGas, tech). The XRD pattern of the powder showed the formation of metallic cobalt. Several graphene layers coating the individual cobalt nanoparticles could be observed by transmission electron microscopy (FIG. 20) and resulted in a carbon content as measured by microanalysis (LECO 900) of 2.2% wt.

Example 15

Figure 21:
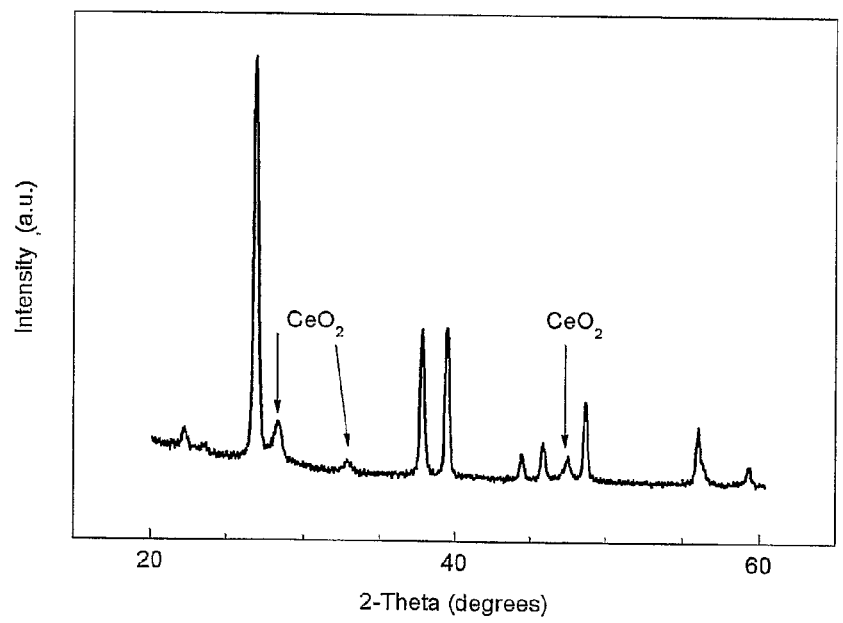
FIG. 21 shows the X-ray diffraction pattern of nanocomposite produced in example 15 (bismuth with 15 vol % ceria). Showing diffraction peaks characteristic for metallic bismuth and three peaks characteristic for ceria (indicated by arrows).
Figure 22:
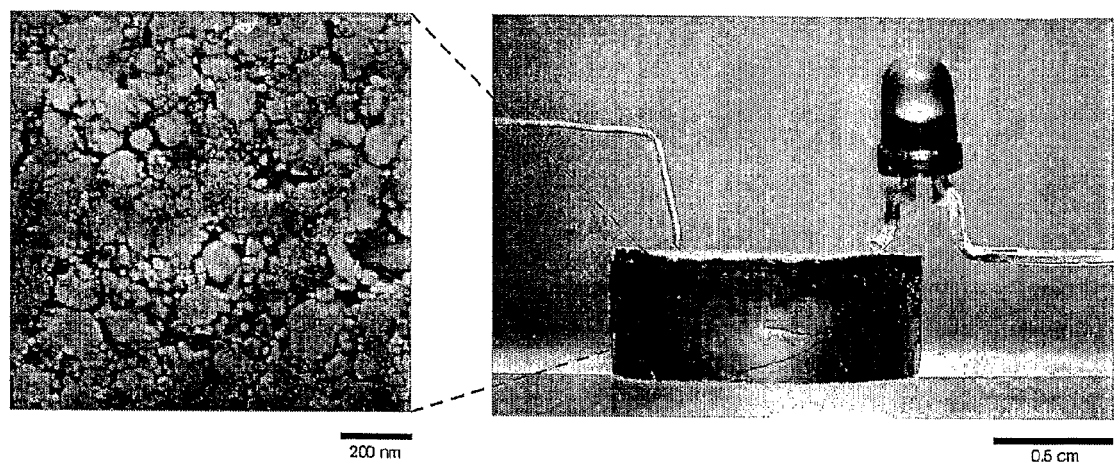
FIG. 22 shows a photograph of a bismuth/ceria composite (15 vol % ceria, example 15) compacted in an uni-axial press at 370 MPa in an electrical current showing good conductivity (right). Scanning electron micrograph (left) of the pill surface showing large bismuth grains separated by much smaller ceria particles

(Bismuth/ceria nanocomposites): 30 grams of bismuth precursor were mixed with 4.6 grams of ceria-octoate (Shephard, 12% wt Cerium) and flame sprayed in a nitrogen atmosphere (conditions see Table 1). The sinter metal tube was used for cooling of the flame with nitrogen (30 l/min, PanGas 5.0). The resulting powder consisted of a composite of ceria and bismuth nanoparticles as shown by X-ray diffraction (FIG. 21). When pressed to a pill at 370 MPa (FIG. 22, uniaxially applied pressure) the conductive (>100 S m$^{-1}$) material of >90% relative density had a Vickers hardness of HV=120 therefore strongly exceeding the Vickers hardness of pure bismuth (HV=16).

TABLE 1

Process conditions for examples 1-15.
($l_N$ = liter at 1 atm and 25° C.)

| Example | Liquid flow rate (ml/min) | Dispersion flow ($l_N$/min) | | Sheath flow ($l_N$/min) | | Atmosphere |
|---|---|---|---|---|---|---|
| Ref 1: $MoO_3$ | 5 | $O_2$ | 5 | $N_2$ | 3 | Air |
| Ref 2 $Co_2O_3$ | 5 | $O_2$ | 5 | $N_2$ | 3 | Air |
| Ex. 1 $MoO_2$ | 6 | $O_2$ | 4 | $N_2$ | 4 | $N_2$; 1000 ppm $O_2$ |
| Ex. 2 $MoO_2$/Mo | 7 | $O_2$ | 5 | $N_2$ | 3 | $N_2$; 100 ppm $O_2$; tube 30 l/min $N_2$ |
| Ex. 3 CoO | 5 | $O_2$ $CH_4$ | 6 1 | $N_2$ | 3 | $N_2$; 1000 ppm $O_2$ |
| Ex. 4 Co/CoN | 6 | $O_2$ | 5 | $N_2$ | 2 | $N_2$; 100 ppm $O_2$; tube 30 $l_N$/min $CO_2$ |
| Ex. 5 FeO/Fe | 5 | $O_2$ $CH_4$ | 6 1 | $N_2$ | 3 | $N_2$; 1000 ppm $O_2$ |
| Ex. 6 Fe | 7 | $O_2$ | 5 | $N_2$ | 3 | $N_2$; 100 ppm $O_2$; tube 30 $l_N$/min $N_2$ |
| Ex. 7 $WO_3$/W | 5 | $O_2$ | 5 | $H_2$ | 2.5 | $N_2$; 1000 ppm $O_2$ |
| Ex. 8 Cu/C I | 2 | $C_2H_2$ $O_2$ | 2 2 | $N_2$ | 20 | $N_2$; 1000 ppm $O_2$ |
| Ex. 9 Cu/C II | 4.5 | $O_2$ | 5 | $N_2$ | 3 | $N_2$; 100 ppm $O_2$ |
| Ex. 10 Cu | 5 | $O_2$ | 5 | $N_2$ | 3 | $N_2$; 100 ppm $O_2$; tube 30 $l_N$/min $N_2$ |
| Ex. 11 Bi | 6 | $O_2$ | 5 | $N_2$ | 2 | $N_2$; 100 ppm $O_2$; tube 30 $l_N$/min $N_2$ |
| Ex. 12 Fe/Co | 6 | $O_2$ | 5 | $N_2$ | 2 | $N_2$; 100 ppm $O_2$; tube 30 $l_N$/min $N_2$ |
| Ex. 14 C/Co | 6 | $O_2$ | 5 | $N_2$ | 2 | $N_2$; 100 ppm $O_2$; Tube: 30 $l_N$/min $N_2$ + 5 $l_N$/min acetylene |
| Ex. 15 | 6 | $O_2$ | 5 | $N_2$ | 2 | $N_2$; 100 ppm $O_2$; tube 30 $l_N$/min $N_2$ |

Analysis:

In addition to the data provided above, the following should be noted:

Particle size: All powders had dimensions in the nano-scale whereby at least 99% of the particles (by number) had dimensions below 200 nm. This can be either seen from TEM and SEM images (FIGS. 6, 11 and 15) as well as from the breadth of the peaks in the XRD patterns which can be related to the crystallite size using the Scherrer Formula.

Particle size distributions: All powders had very narrow size distributions as measured by Grass and Stark (2005) (FIGS. 6, 11 and 15) and as further expected from a turbulent flame process (Vemury and Pratsinis 1995, Grass and Stark 2005). Said distribution can be characterized by a geometric standard deviation $\sigma_g$ of smaller than 1.6, preferably smaller than 1.4. In materials consisting of more than one material (e.g. metal/ceramic nanocomposites) the particle size distribution of each individual material present in the produced powder can be characterized by a geometric standard deviation $\sigma_g$ of smaller than 1.6, preferably smaller than 1.4.

Shape: Depending on the sintering characteristics of the material the produced powders were either spherical or slightly agglomerated forming fractal agglomerates consisting of 2-20 primary particles each.

Combustion stochiometry: For all examples presented above not enough oxygen was present for full combustion of the fuel (mainly carboxylic acids, aromatics and THF). The process conditions were optimized so that the fuel combustion product consisted mainly of CO and $H_2$ leading to a strongly reducing atmosphere. This allowed for the production of e.g. metals. In addition, these conditions allowed to avoid oxidation of the produced metals as well as soot production and powder contamination.

Flame atmosphere: Examples 1-2 for molybdenum, 3-4 for cobalt and 7-8 for iron showed the large influence of the oxygen concentration in the atmosphere surrounding the flame. At ambient air concentrations (20% $O_2$) the produced materials were highly stable and fully oxydized ceramic powders with very high surface areas. When decreasing the oxygen concentration to below 0.1% (volume/volume), novel phases such as reduced metal oxides (wustite, molybdenum (IV) oxide) could be produced. At even lower oxygen concentrations (below 100 ppm) there was not sufficient oxygen present in the flame for oxidation of the metal to the corresponding oxides or thermodynamically most favourable oxides, and therefore metallic particles or non-oxidic ceramics were produced. It was found that the flame atmosphere could be very well controlled by using an additional sinter-metal tube. This setup allowed the continuous production of non-oxidic particles or reduced oxides of high quality by providing an aerodynamically designed tubular reactor. It was found that by the radial inflow of coolant/reactant gases the deposition of any powder on the inner wall of the tube can be avoided. The use of non-porous tubes resulted in thermophoretically driven particle deposition and powder loss and inhomogenity. The above described porous tube also gave the possibility of introducing other gases to the flame atmosphere as seen in Example 6 where $CO_2$ was introduced to shift the Boudouard equilibrium and therefore control the formation or amount of soot on or in the product.

Starting materials: If several reducible metals are used in the process as described herein, alloys or nanocomposites containing the corresponding metals can be manufactured (see examples 12 and 15).

REFERENCES

Bahador, S. K.; Semiconducting metal oxide photoelectrodes: Their propped characteristics and implications, *International Journal of Materials & Product Technology*, 1995, 10, 456.

Changyi, H., Yiqun, G., Zhongyi, S.; The piezoresistance coefficient of copper and copper-nickel alloys, *Journal of Material Science*, 2000, 35, 381.

Dez, R., Tenegal, F., Reynaud, C., Mayne, M., Armand, X., Herlin-Boime, N.; Laser synthesis of silicon carbonitride nanopowdedrs; structure and thermal stability, *Journal of the European Ceramic Society*, 2002, 22, 2969.

Eroglu, S., Zhang, S. C., Messing, G. L.; Synthesis of nanocrystalline Ni—Fe alloy powders by spray pyrolysis, *Journal of Materials Research*, 1996, 11, 2131.

Grass, R. N., Stark, W. J.; Flame synthesis of calcium-, strontium-, barium fluoride nanoparticles and sodium chloride, *Chemical Communications*, 2005, 1767.

Huber, M., Stark, W. J., Loher, S., Maciejewski, M., Krumeich, F., Baiker, A.; Flame synthesis of calcium carbonate nanoparticles, *Chemical Communications*, 2005, 648.

Janssen, E. A. W. G., Zirkzee, H. F., German, A. L., Maxwell, I. A.; Particle Sizing of Flocculated Latex Particles by Physisorption of Nitrogen, *Journal of Applied Polymer Science*, 1994, 52, 1913.

Kodama, R. H.; Magnetic nanoparticles, *Journal of magnetism and magnetic materials*, 1999, 200, 359.

Knipping, J., Wiggers, H., Kock, B. F., Hulser, T., Rellinghaus, B., Roth, P.; Synthesis and characterization of nanowires formed by self-assembled iron particles, *Nanotechnology*, 2004, 11, 1665.

Levy, R. B., Boudart, M.; Platinum-like behaviour of tungsten carbide in surface catalysis, *Science*, 1973, 181, 547.

Li, Y., Moon, K-s., Wong, C. P.; Electronics without lead, *Science*, 2005, 308, 1419.

Loher, S., Stark, W. J., Maciejewski, M., Baiker, A., Pratsinis, S. E., Reichardt, D., Maspero, F., Krumeich, F., Gunther, D.; Fluoro-apatite and calcium phosphate nanoparticles by flame synthesis, *Chemistry of Materials*, 2005, 17, 36.

Lou, Y. B., Yin, M., O'Brien, S., Burda, C.; Electron-hole pair relaxation dynamics in binary copper-based semiconductor quantum dots, *Journal of the Electrochemical Society*, 2005, 152, G427.

Milad, I. K., Smith, K. J., Wong, P. C., Mitchell K. A. R.; A comparison of bulk metal nitride catalysts for pyridine hydrodenitrogenation, *Catalysis Letters*, 1998, 52, 113.

Modrow, H., Palina, N., Kumar, Ch. S. S. R., Doomes, E. E., Aghasyan, M., Palshin, V., Tittsworth, R., Jiang, J. C., Hormes, J.; Characterization of Size Dependent Structural and Electronic Properties of CTAB-Stabilized Cobalt Nanoparticles by X-ray Absorption Spectroscopy, *Physica Scripta.*, 2005, 115, 790.

Nicolais, L., Metal-polymer nanocomposites, 2005, Hoboken Wiley-Interscience.

Riedel E.; Anorganische Chemie, 4. Auflage, 1999, Walter de Gruyter New York.

Vemury, S., Pratsinis S. E.; Self-preserving size distributions of agglomerates, *Journal of Aerosol Science*, 1995, 26, 175.

Wang, H., Li, W., Zhang, M.; New Approach to the Synthesis of Bulk and Supported Bimetallic Molybdenum Nitrides, *Chemistry of Materials*, 2005, 17, 3262.

Wegner, K., Walker, B., Tsantilis, S., Pratsinis S. E.; Design of metal nanoparticle synthesis by vapor flow condensation, *Chemical Engineering Science*, 2002, 57, 1753.

While there are shown and described presently preferred embodiments of the invention, it is to be distinctly understood that the invention is not limited thereto but may be otherwise variously embodied and practiced within the scope of the following claims.

The invention claimed is:

1. A method for the production of powders, said powders being selected from the group consisting of metal powders coated with a protecting layer of carbon and alloy powders coated with a protecting layer of carbon said powders consisting of particles having a volume-surface-average diameter below 100 nm, said method comprises flame spray pyrolysis (FSP) of a combustible precursor solution, and said method being performed in an atmosphere with an $O_2$ concentration below 100 ppm (volume/volume) in the flame off-gas, measured above the flame where the flame off gas has cooled to below 200° C., and wherein said method being performed using an oxygen-containing gas as oxidizing agent and wherein the fuel-oxygen equivalence ratio is above 1.

2. The method of claim 1, wherein the $O_2$ concentration is below 10 ppm (volume-volume).

3. The method of claim 1, wherein the fuel-oxygen equivalence ratio is between 1.0 and 3.0.

4. The method of claim 1, wherein the ratio of molar hydrogen content/molar metal content, both measured in the off gas, is at least 2/1.

5. The method of claim 1, wherein the temperature is above 800° C. within the burning flame.

6. The method of claim 1, wherein combustible precursor solution comprises one or more soluble, metal comprising compounds selected from the group comprising organometallic compounds, metal salts, metal complexes and combinations thereof.

7. The method of claim 6, wherein the metal comprising compound is selected from the group comprising metal carboxylates, metal alkoxides, metal triethanolamines, metal glycolates, organically substituted ammonium salts of metal-containing complex anions or mixtures thereof.

8. The method of claim 1, wherein the flame is shielded within a porous tube.

9. The method of claim 8, wherein one or more reactive gases are applied through said porous tube.

10. The method of claim 9, wherein the reactive gases are selected from the group consisting of, $CO_2CO$, $H_2$, $NH_3$, $CH_4$, $H_2S$, $H_2Se$, $H_2Te$, $B_2H_6$, $SiH_4(CH_3)SiH_3$, $(CH_3)_2SiH_2$, $(CH_3)_3SiH$, $(CH_3)_4Si$, ethylene, butadiene, ethane, acetylene, propane, and mixtures thereof, and/or wherein said reactive gases contain previously evaporated liquids selected from the group consisting of acrylonitrile, hexamethyldisiloxane, hexamethyldisilazane, tetramethoxysilane, tetraethoxysilane, titanium-tetraisopropoxide and mixtures thereof.

11. The method of claim 1 wherein the powders produced are selected from the group of metals having a standard potential between +0.52 eV and −0.80 eV and alloys containing a metal having a standard potential between +0.52 eV and −0.80 eV.

12. The method of claim 11 wherein metals have a standard potential between +0.52 eV and −0.42 eV and the alloys contain a metal with a standard potential between +0.52 eV and −0.42 eV.

13. The method of claim 1 wherein $H_2$ and/or CO are separated from the off gas and purified.

14. The method according to claim 1, wherein the combustible precursor solution comprises one or more metal comprising compounds selected from the group of Ag, Fe, Co, Cu, Mo, Bi, W and the combustible solvent is selected from aliphatic, cyclic or heterocyclic compounds containing no aromatic systems or long aliphatic chains and the fuel-oxygen equivalence ratio is between 1.0 and 2.0.

15. The method of claim 1, wherein the reaction time is below 1 second.

16. The method of claim 1, wherein said combustible precursor solution consists of one or more metal comprising compounds.

17. The method of claim 16, wherein said one or more metal comprising compounds are selected from the group of metal carboxylates.

18. The method of claim 1, wherein said combustible precursor solution comprises one or more metal comprising compounds and one or more solvents.

19. The method of claim 18, wherein said one or more solvents act as fuels.

20. The method of claim 18, wherein said one or more metal comprising compounds are selected from the group of metal carboxylates.

* * * * *

UNITED STATES PATENT AND TRADEMARK OFFICE
CERTIFICATE OF CORRECTION

| | | Page 1 of 1 |
|---|---|---|
| PATENT NO. | : 8,182,573 B2 | |
| APPLICATION NO. | : 12/065882 | |
| DATED | : May 22, 2012 | |
| INVENTOR(S) | : Stark et al. | |

It is certified that error appears in the above-identified patent and that said Letters Patent is hereby corrected as shown below:

On the title page, item (57), under "Abstract", in Column 2, Line 5, delete "powders/naoncomposites" and insert -- powders/nanocomposites --, therefor.

On the title page, item (57), under "Abstract", in Column 2, Line 7, delete "nanocompsites" and insert -- nanocomposites --, therefor.

In the Claims

In Column 21, Line 11, in Claim 10, delete "$CO_2CO$," and insert -- $CO_2$, CO, --, therefor.

Signed and Sealed this
Sixteenth Day of September, 2014

Michelle K. Lee
*Deputy Director of the United States Patent and Trademark Office*